US012122164B2

(12) United States Patent
Kudo et al.

(10) Patent No.: US 12,122,164 B2
(45) Date of Patent: Oct. 22, 2024

(54) LIQUID CONTAINER

(71) Applicant: SEIKO EPSON CORPORATION, Tokyo (JP)

(72) Inventors: Koji Kudo, Shiojiri (JP); Noriyuki Fukasawa, Matsumoto (JP); Hiroyuki Kawate, Hokuto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 156 days.

(21) Appl. No.: 17/868,964

(22) Filed: Jul. 20, 2022

(65) Prior Publication Data

US 2023/0028547 A1 Jan. 26, 2023

(30) Foreign Application Priority Data

Jul. 21, 2021 (JP) ................................ 2021-120402

(51) Int. Cl.
*B41J 2/175* (2006.01)

(52) U.S. Cl.
CPC ....... *B41J 2/17506* (2013.01); *B41J 2/17513* (2013.01); *B41J 2002/17516* (2013.01)

(58) Field of Classification Search
CPC .................................................... B41J 2/17506
See application file for complete search history.

(56) References Cited

U.S. PATENT DOCUMENTS

2005/0179751 A1* 8/2005 Seino .................. B41J 2/17559 347/86
2006/0227190 A1* 10/2006 Ishizawa .............. B41J 2/17513 347/86
2009/0064501 A1* 3/2009 Kimura ................ B41J 2/17559 29/890.1
2009/0322840 A1* 12/2009 Wanibe ................ B41J 2/17566 137/15.01
2014/0362148 A1* 12/2014 Ishizawa .................. B41J 29/13 347/86
2019/0352053 A1 11/2019 Ozeki et al.

FOREIGN PATENT DOCUMENTS

JP 2019-198990 A 11/2019

* cited by examiner

*Primary Examiner* — Shelby L Fidler
(74) *Attorney, Agent, or Firm* — Oliff PLC

(57) ABSTRACT

A liquid container refillable with liquid to be supplied to a printer includes a bag; a liquid supplying port member having a liquid supplying port; a liquid supply flow passage provided inside the liquid supplying port member; a liquid filling flow passage branching off from the liquid supply flow passage; and a communication port provided inside the liquid supplying port member and being in communication with the liquid filling flow passage and facing an internal surface of the bag. The bag is fixed to the liquid supplying port member such that a gap is formed between the bag and the peripheral portion of the communication port due to a flow of the liquid from the liquid supply flow passage to the liquid filling flow passage, the gap being in communication with the liquid containing portion through the communication port.

4 Claims, 22 Drawing Sheets

LIQUID CONTAINER

The present application is based on, and claims priority from JP Application Serial Number 2021-120402, filed Jul. 21, 2021, the disclosure of which is hereby incorporated by reference herein in its entirety.

BACKGROUND

1. Technical Field

The present disclosure relates to a liquid container.

2. Related Art

In the field of a liquid container detachably attached to a printer and configured to supply liquid to the printer, it has been proposed to detach the liquid container from the printer and then refill the liquid container with new liquid for reuse when the amount of the liquid left in the liquid container has become equal to or less than a lower limit value. In JP-A-2019-198990, a communication portion for fluid communication with the outside is newly provided on a flexible bag in which consumed liquid was contained, and new liquid is refilled into the bag of the detached liquid container through the communication portion.

However, in the liquid container disclosed in JP-A-2019-198990, the communication portion is formed by processing the bag, for example, by cutting away an end portion of the bag or by boring a hole in the bag. Therefore, there is a problem in that the size of the bag decreases, resulting in a decrease in the amount of liquid that can be contained in it. Moreover, there is a problem in that wastes increase because the cut-off end portion of the bag cannot be reused. Another problem is that a member for sealing the communication portion is needed, and a sealing step is also needed. Still another problem is a risk of decrease in liquid quality resulting from, for example, the entry of a foreign object into the bag during the cutting process or the hole-boring process or the entry of a foreign object contained in ambient air into the bag due to the exposure of the hole to ambient conditions.

SUMMARY

In a certain aspect of the present disclosure, a liquid container refillable with liquid to be supplied to a printer is provided. The liquid container includes: a bag having a space serving as a liquid containing portion inside; a liquid supplying port member having a liquid supplying port, an end portion of the bag being fixed to the liquid supplying port member; a liquid supply flow passage provided inside the liquid supplying port member, the liquid flowing through the liquid supply flow passage for communication from the liquid containing portion toward the liquid supplying port; a liquid filling flow passage provided inside the liquid supplying port member and branching off from the liquid supply flow passage; and a communication port provided inside the liquid supplying port member and being in communication with the liquid filling flow passage and facing an internal surface of the bag, wherein the bag is disposed in such a way as to come into contact with a peripheral portion of the communication port and is fixed to the liquid supplying port member such that a gap is formed between the bag and the peripheral portion due to a flow of the liquid from the liquid supply flow passage to the liquid filling flow passage and such that the gap is in communication with the liquid containing portion through the communication port.

BRIEF DESCRIPTION OF THE DRAWINGS

FIG. 23 is a perspective view illustrating the end portion of the bag when the liquid is filled in.

DESCRIPTION OF EXEMPLARY EMBODIMENTS

A. First Embodiment

A1. Overall Structure of Printer

Figure 1:
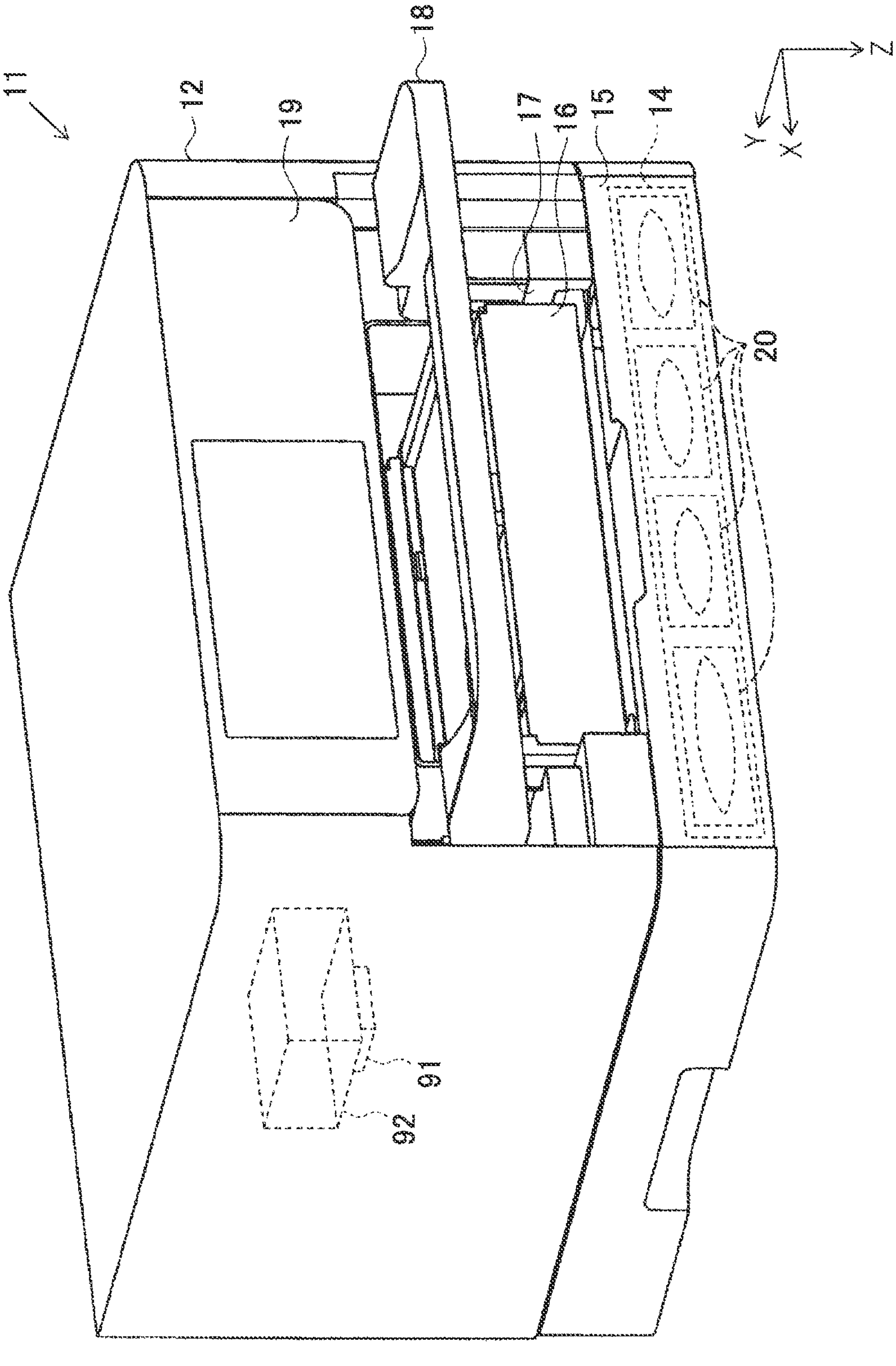
FIG. 1 is a schematic perspective view illustrating a printer to which liquid is supplied for replenishment from a liquid container according to an exemplary embodiment of the present disclosure.

FIG. 1 is a schematic perspective view illustrating a printer 11 to which liquid is supplied for replenishment from a liquid container according to an exemplary embodiment of the present disclosure. The printer 11 is, for example, an ink-jet printer that records dots to form a print image by ejecting ink, which is an example of liquid, onto a medium such as paper.

The printer 11 includes a housing 12. The housing 12 is an armoring exterior that has a shape of a substantially rectangular parallelepiped. A container accommodating portion 14 for detachably accommodating liquid containers 20 is provided inside the housing 12. On the front portion of the housing 12, a front cover 15 and an attachment port 17 are provided in this order upward from the bottom. The front cover 15 can be rotated for opening and closing the container accommodating portion 14. A cassette 16 capable of containing sheets of a medium (not illustrated) is attached into the attachment port 17. An ejected sheet tray 18, onto which the medium is ejected, and an operation panel 19, which is operated by a user for giving operational instructions to the printer 11, are provided over the attachment port 17. The front of the housing 12 means a frontal lateral face having a height and a width and supposed to face the user who operates the printer 11.

A plurality of liquid containers 20 can be attached to the container accommodating portion 14 according to the present embodiment such that they are arranged next to one another in a width direction. Each of the plurality of liquid containers 20 contains ink as an example of liquid. Each of the plurality of liquid containers 20 contains ink of any corresponding color among a plurality of colors ejected by the printer 11. In the present embodiment, the printer 11 ejects ink of C (cyan), M (magenta), Y (yellow), and K (black). The black ink is contained in a liquid container 20 having a relatively large width. The ink of the other colors (C, M, and Y) is contained in liquid containers 20 having a relatively small width. The colors of the ink ejected by the printer 11 is not limited to C, M, Y, and K. Ink of any other color may be ejected. All of the liquid containers 20 each containing ink of the corresponding one color may have the same width. Though the container accommodating portion 14 according to the present embodiment has a single tier structure vertically (Z direction described later), a multiple tier structure may be adopted. If a multiple tier structure is adopted, for example, one liquid container 20 having a relatively large width may be attached to the container accommodating portion 14 of one tier among a plurality of tiers.

A liquid ejecting unit 91 configured to eject liquid from nozzles and a carriage 92 configured to reciprocate in a scanning direction are provided inside the housing 12. The scanning direction is the same as the width direction of the printer 11. The liquid ejecting unit 91 moves together with the carriage 92 and ejects liquid supplied from the liquid container 20 toward a medium, thereby performing printing on the medium. In another embodiment, the liquid ejecting unit 91 may be a line head that does not reciprocate and is stationary at a fixed position.

In the present embodiment, the direction intersecting with a movement path along which the liquid container 20 moves in the process of being attached to the container accommodating portion 14 is the width direction, and the direction in which the movement path extends is the depth direction. It is preferable if the movement path and the width direction intersect with each other at a right angle. The width direction and the depth direction are substantially along a horizontal plane. In the drawings, the Z axis represents the direction of gravity when the printer 11 is installed on a horizontal plane as in a normal state for use, and the Y axis represents the direction in which the liquid container 20 moves in the process of being attached to the container accommodating portion 14. The movement direction may be referred to also as the direction of attachment to, or the direction of insertion into, the container accommodating portion 14. The direction that is the opposite of the movement direction may be referred to as the taking-out direction. The X axis orthogonal to the Z axis and the Y axis represents the width direction. The width direction, the gravity direction, and the attachment direction intersect with one another. The width direction denotes the direction of width. The gravity direction denotes the direction of height. The attachment direction denotes the direction of depth. It is preferable if the width direction, the gravity direction, and the attachment direction are orthogonal to one another.

In the description below, unless otherwise specified, the printer 11 is assumed to be in a normal state for use. The direction parallel to the Z axis will be referred to as the Z direction. The orientation, of the Z direction, that is the same as the gravity direction will be referred to as the +Z direction, and the orientation that is the opposite of the gravity direction will be referred to as the −Z direction. The direction parallel to the Y axis will be referred to as the Y direction. One orientation, of the Y direction, will be referred to as the +Y direction, and the other orientation will be referred to as the −Y direction. The direction parallel to the X axis will be referred to as the X direction. One orientation, of the X direction, will be referred to as the +X direction, and the other orientation will be referred to as the −X direction. The +Y direction corresponds to the direction in which the liquid container 20 moves in the process of being attached to the container accommodating portion 14.

Figure 2:
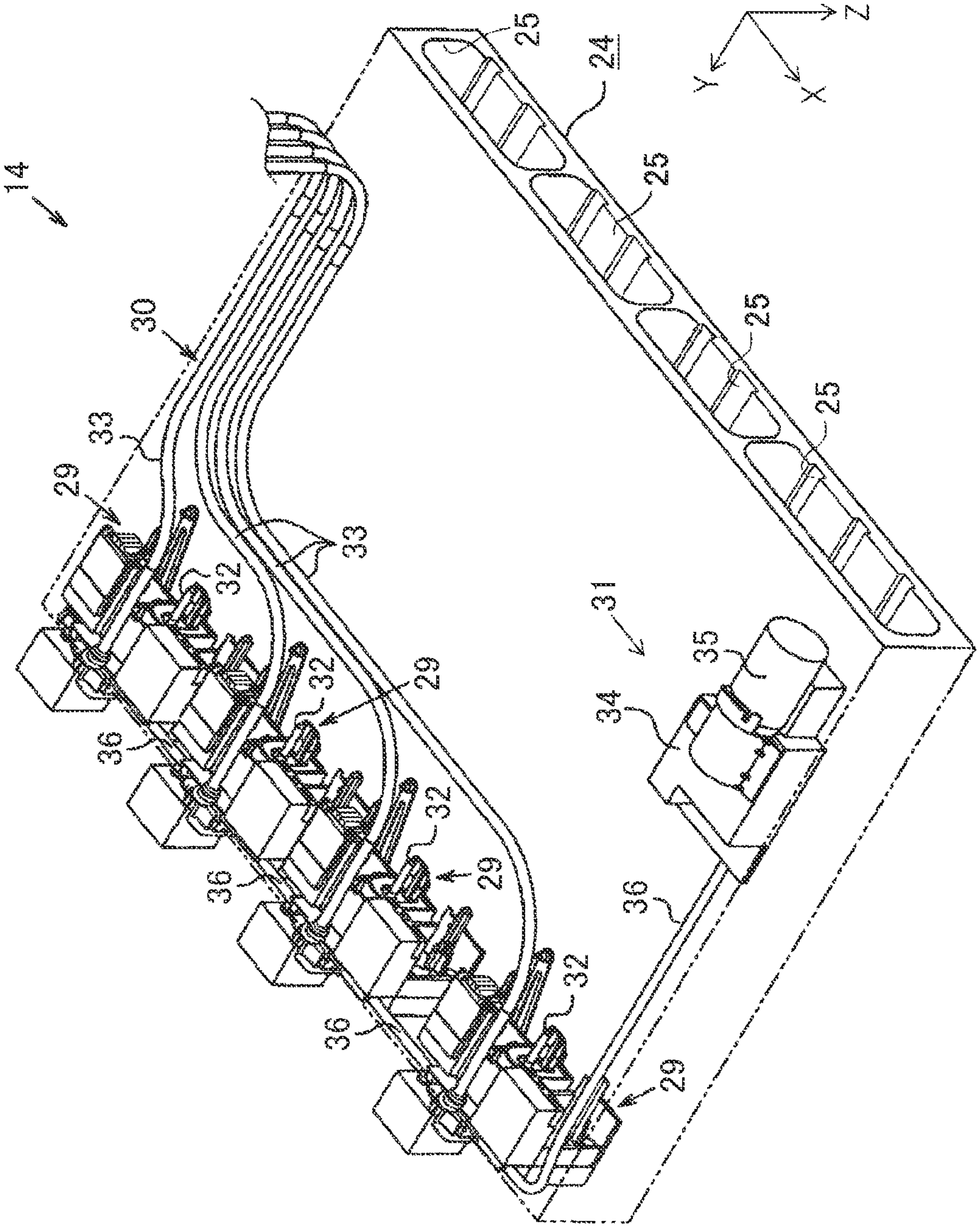
FIG. 2 is a schematic perspective view illustrating a container accommodating portion.

FIG. 2 is a schematic perspective view illustrating the container accommodating portion 14. As described above, in the present embodiment, the container accommodating portion 14 is able to accommodate four liquid containers 20. A frame body 24 is disposed on the −Y-directional side of the container accommodating portion 14. The frame body 24 has insertion slots 25 for inserting the liquid containers 20 into the container accommodating portion 14.

The liquid containers 20 are attached to the container accommodating portion 14 by being inserted through the insertion slots 25 and then being moved in the +Y direction. In FIG. 2, only a part of the frame body 24 near a front plate having the insertion slots 25 is depicted by solid-line illustration. On the +Y-side end region of the container accommodating portion 14, four connection mechanisms 29 corresponding to the liquid containers 20 are provided individually. The connection mechanisms 29 are mechanisms for coupling the respective liquid containers 20 to the printer 11.

The printer 11 includes supply flow passages 30 and a supplying mechanism 31. Liquid is supplied from the liquid containers 20 attached to the container accommodating portion 14 toward the liquid ejecting unit 91 through the supply flow passages 30. The supplying mechanism 31 is configured to send the liquid contained in the liquid containers 20 into the supply flow passages 30.

The supply flow passages 30 are provided individually for the respective kinds of the liquid. Each supply flow passage 30 includes a liquid inlet portion 32, to which the liquid container 20 is configured to be coupled, and a supply tube 33, which is flexible. In the present embodiment, the supply flow passages 30 are provided individually for the respective ink colors. The liquid inlet portion 32 is a needle-like conduit member extending in the −Y direction. A pump chamber (not illustrated) is provided between the liquid inlet portion 32 and the supply tube 33. The downstream end of the liquid inlet portion 32 and the upstream end of the supply tube 33 are in communication with the pump chamber. The pump chamber is partitioned from a non-illustrated pressure change chamber by a non-illustrated flexible film.

The supplying mechanism 31 includes a pressure changing mechanism 34, a driving source 35 for the pressure changing mechanism 34, and a pressure change flow passage 36 for connection between the pressure changing mechanism 34 and the pressure change chamber mentioned above. The driving source 35 is, for example, a motor. When the pressure changing mechanism 34 driven by the driving source 35 reduces the pressure of the pressure change chamber via the pressure change flow passage 36, the flexible film deforms to change its position toward the pressure change chamber. Therefore, the pressure of the pump chamber decreases. Because of the decrease in the pressure of the pump chamber, the liquid contained in the liquid container 20 is sucked into the pump chamber through the liquid inlet portion 32. This operation is called as "sucking operation". After the sucking operation, when the pressure changing mechanism 34 releases the pressure change chamber from the pressure-reduced state via the pressure change flow passage 36, the flexible film deforms to change its position toward the pump chamber. Therefore, the pressure of the pump chamber increases. Because of the increase in the pressure of the pump chamber, the liquid contained in the pump chamber flows out in a pressurized state into the supply tube 33. This operation is called as "forcing-out operation". By repeating the sucking operation and the forcing-out operation alternately, the supplying mechanism 31 supplies the liquid from the liquid container 20 to the liquid ejecting unit 91.

Figure 3:
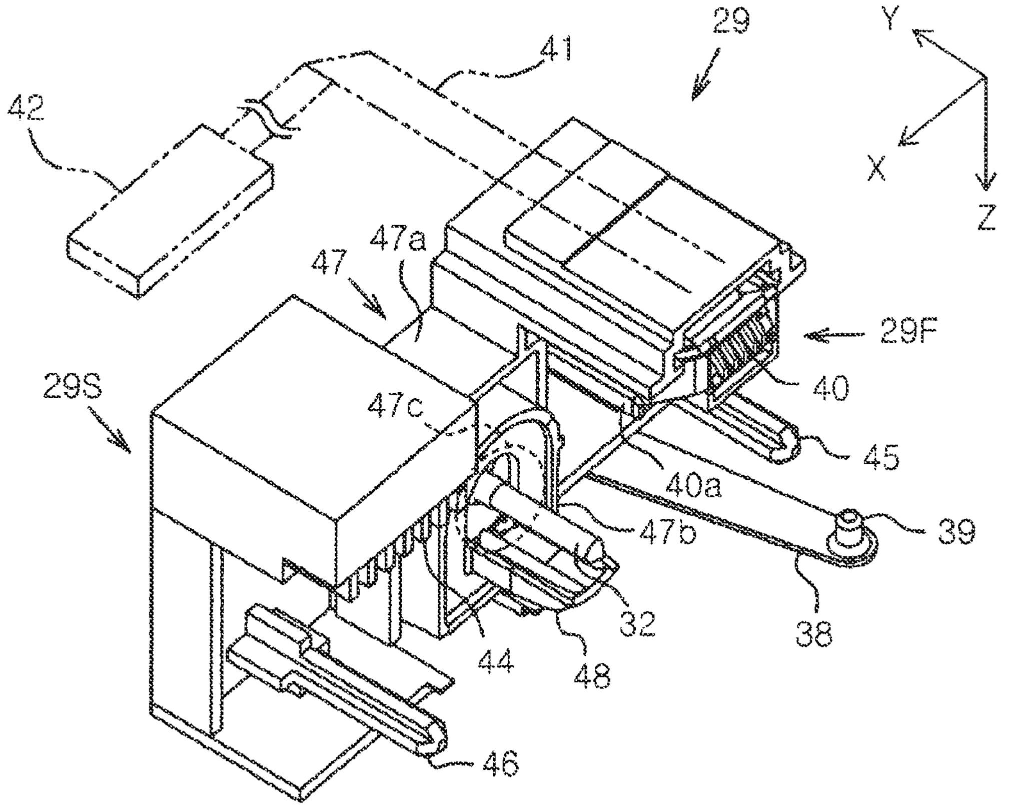
FIG. 3 is a schematic perspective view illustrating connection mechanisms.

FIG. 3 is a schematic perspective view illustrating the connection mechanism 29. The connection mechanism 29 includes a first connection mechanism 29F and a second connection mechanism 29S at respective positions between which the liquid inlet portion 32 is interposed in the width direction. The first connection mechanism 29F includes an apparatus-side anchoring structure 38. In a container-accommodated state, meaning a state of attachment of the liquid container 20 to the container accommodating portion 14, the apparatus-side anchoring structure 38 is in engagement with a container-side anchoring structure of an adapter 60 (first supporting portion 61), which will be described later, to restrict the movement of the liquid container 20 in the −Y direction. In the first embodiment, the apparatus-side anchoring structure 38 is an arm-like member. The apparatus-side anchoring structure 38 is disposed below the liquid inlet portion 32 and protrudes in the −Y direction, namely, the taking-out direction in which the liquid container 20 is taken out. The apparatus-side anchoring structure 38 is configured to be able to pivot on its base end and thus move its distal end by pivoting. An engagement portion 39 is provided on the distal end of the apparatus-side anchoring structure 38. The engagement portion 39 is disposed on the movement path along which the liquid container 20 moves in the process of being attached to the container accommodating portion 14 (see FIG. 2). In the first embodiment, the engagement portion 39 is configured as a convex portion protruding vertically upward from the apparatus-side anchoring structure 38.

The first connection mechanism 29F includes an apparatus-side electric connection portion 40. The apparatus-side electric connection portion 40 is disposed above the liquid inlet portion 32 and protrudes in the −Y direction, namely, the taking-out direction. The apparatus-side electric connection portion 40 is connected to a control device 42 via an electric wiring line 41 such as a flat cable. The apparatus-side electric connection portion 40 is disposed such that it is oriented obliquely downward because its upper end protrudes more in the taking-out direction than its lower end. A pair of convex guides 40*a* bulging in the width direction and extending in the attachment direction are provided on the respective sides of the apparatus-side electric connection portion 40 in the width direction.

The second connection mechanism 29S includes a block 44 for preventing wrong mismatching insertion. The block 44 is disposed above the liquid inlet portion 32 and protrudes in the taking-out direction. The block 44 has a downward concave-and-convex array shape. This concave-and-convex shape differs from one connection mechanism 29 provided in the container accommodating portion 14 to another.

The connection mechanism 29 has a pair of positioners, namely, a first positioning portion 45 and a second positioning portion 46. The first positioning portion 45 is included in the first connection mechanism 29F. The second positioning portion 46 is included in the second connection mechanism 29S. Each of the first positioning portion 45 and the second positioning portion 46 is configured as a shaft-like portion extending in the −Y direction. The first positioning portion 45 and the second positioning portion 46 are provided at a distance from each other, with the liquid inlet portion 32 interposed therebetween. It is preferable if the protruding length of each of the first positioning portion 45 and the second positioning portion 46 in the taking-out direction is greater than the protruding length of the liquid inlet portion 32 in the taking-out direction.

The connection mechanism 29 further includes a pushing mechanism 47 and a drip catching portion 48. The pushing mechanism 47 is disposed around the liquid inlet portion 32. The drip catching portion 48 protrudes in the taking-out direction under the liquid inlet portion 32. The pushing mechanism 47 includes an enclosure member 47*a*, a pushing portion 47*b*, and an urging portion 47*c*. The enclosure member 47*a* surrounds the base end portion of the liquid inlet portion 32. The pushing portion 47*b* protrudes from the enclosure member 47*a* in the taking-out direction. The urging portion 47*c* urges a case 13 by means of the pushing portion 47*b*. The urging portion 47*c* may be, for example, a coil spring provided between the enclosure member 47*a* and the pushing portion 47*b*.

As described earlier, the connection mechanism 29 is located at the +Y-side end region of the container accommodating portion 14 (see FIG. 2). Therefore, the liquid inlet portion 32 and the apparatus-side electric connection portion 40, which are included in the connection mechanism 29, are located at the +Y-side end region of the container accommodating portion 14. Moreover, the liquid inlet portion 32, the apparatus-side anchoring structure 38, the first positioning portion 45, and the second positioning portion 46 extend from the +Y-side end region of the container accommodating portion 14 toward the −Y directional side.

A2. Schematic Structure of Liquid Container 20

Figure 4:
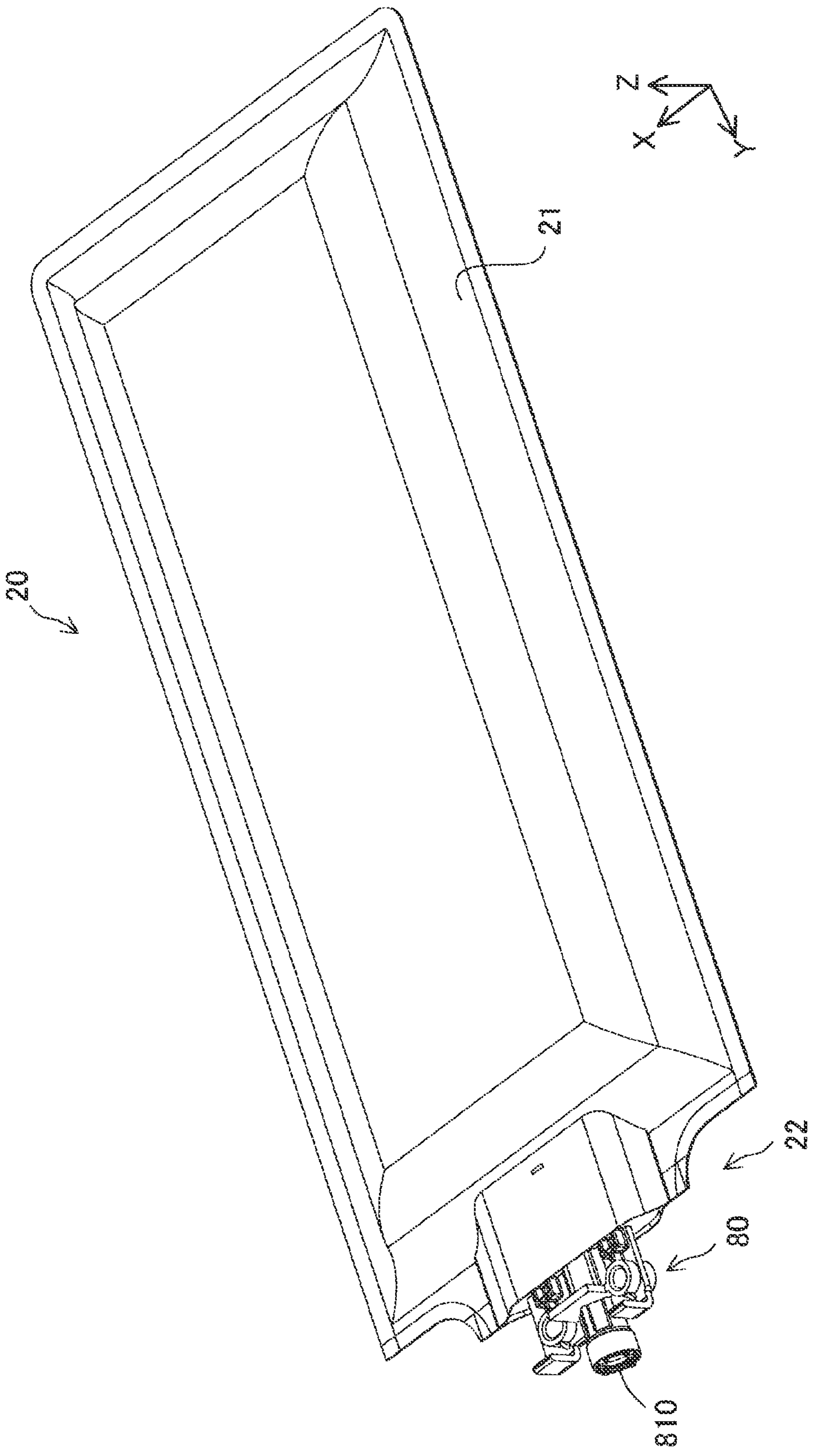
FIG. 4 is a perspective view illustrating the external structure of a liquid container without an adapter.
Figure 5:
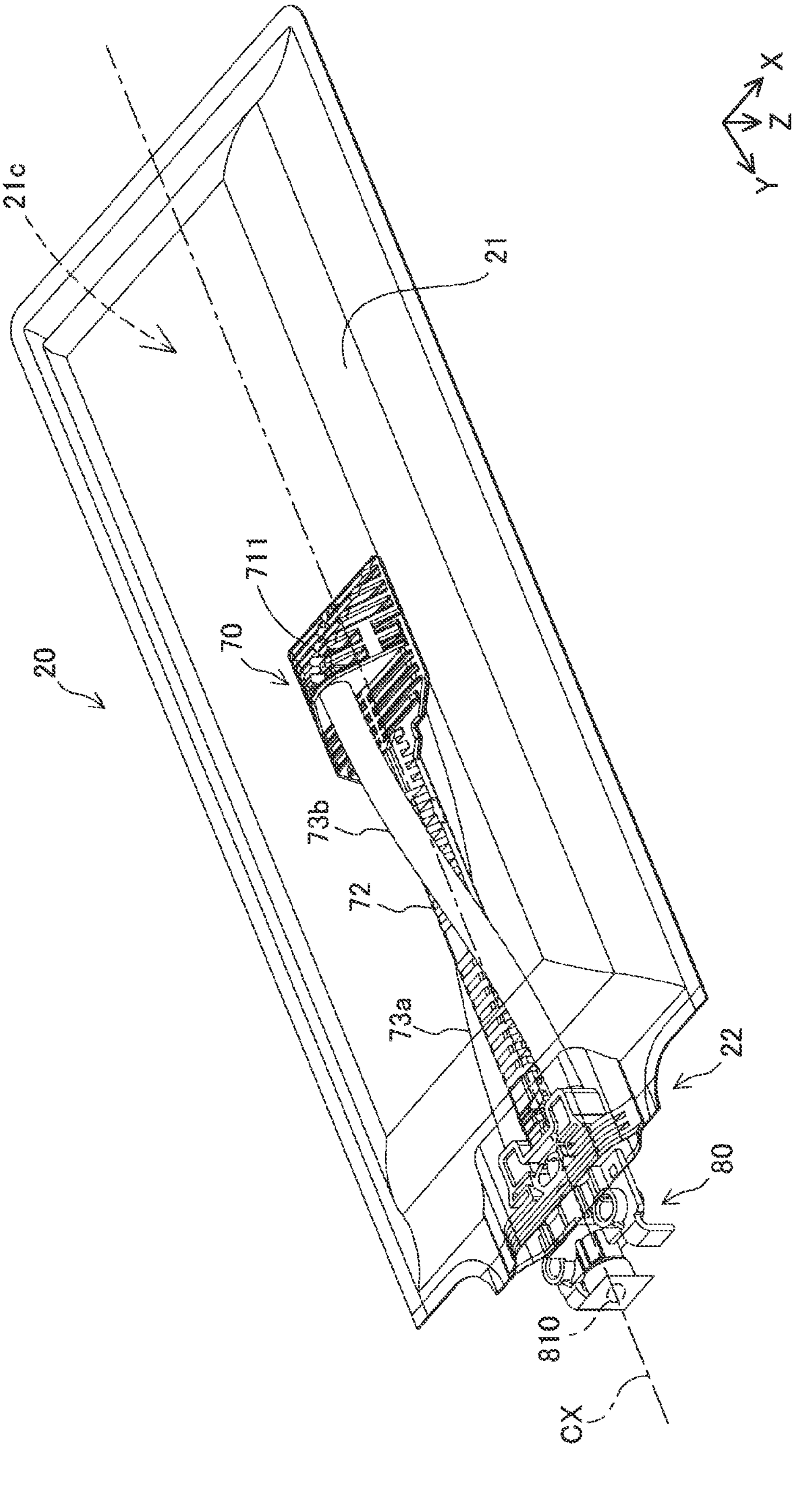
FIG. 5 is a perspective view illustrating the external structure of the liquid container without the adapter, and the internal structure of the liquid container.
Figure 6:
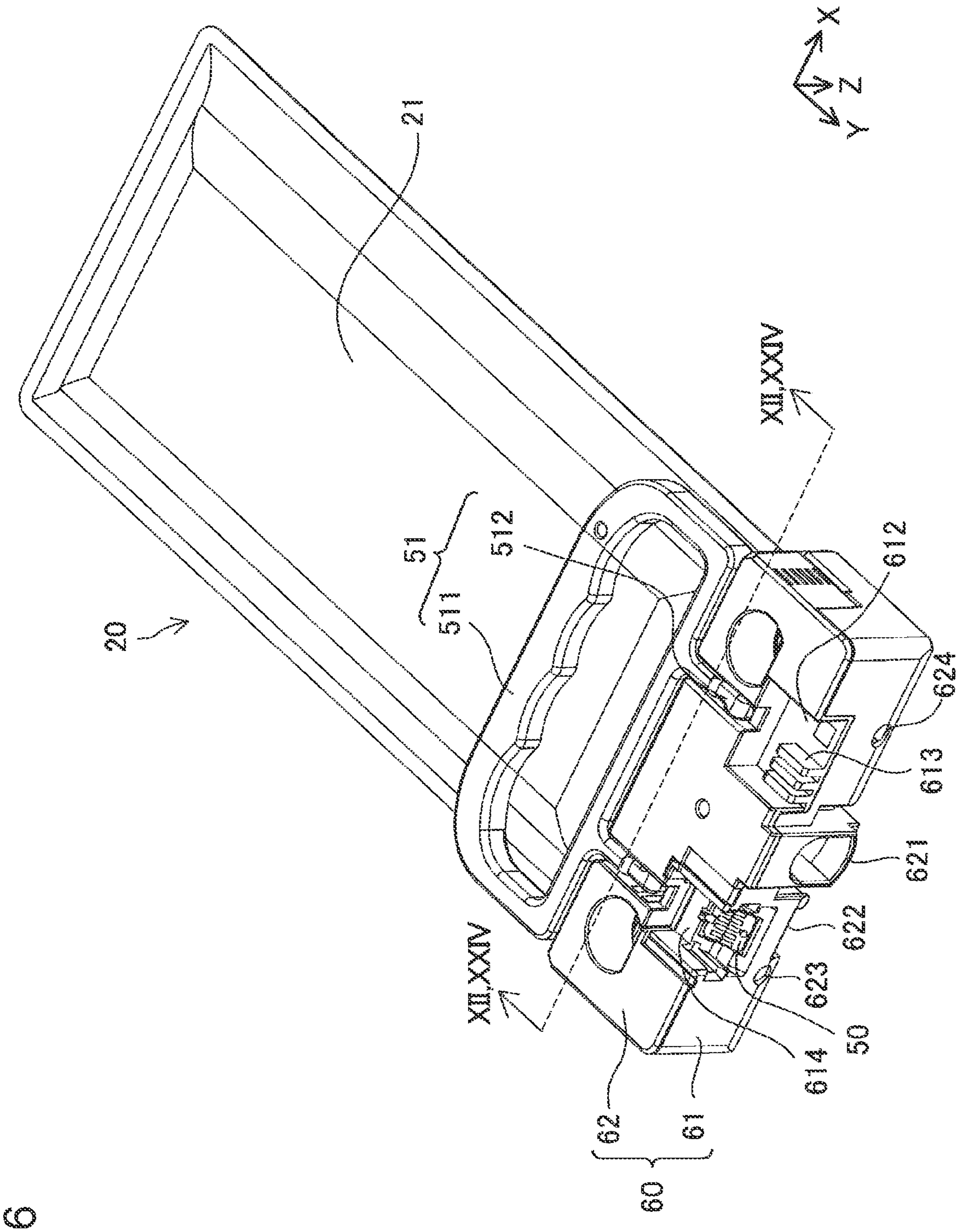
FIG. 6 is a perspective view illustrating the external structure of the liquid container with the adapter.

FIG. 4 is a perspective view illustrating the external structure of the liquid container 20 without the adapter 60. FIG. 5 is a perspective view illustrating the external structure of the liquid container 20 without the adapter 60, and the internal structure of the liquid container 20. FIG. 6 is a perspective view illustrating the external structure of the liquid container 20 with the adapter 60. In FIG. 5, for easier explanation, a part of the structure housed inside a bag 21, which will be described later, is illustrated in a state of being seen through the bag 21.

As illustrated in FIGS. 4, 5, and 6, the liquid container 20 includes the bag 21 having a space serving as a liquid containing portion inside, a liquid supplying port member 80, a spacer member 70, a pair of liquid conduit tubes 73*a* and 73*b*, a connecting member 72, and the adapter 60.

The bag 21 is flexible. In a plan view, the bag 21 according to the present embodiment has a substantially rectangular shape whose longer sides extend in the Y direction and whose shorter sides extend in the X direction. There is an opening in the +Y-side end portion 22 of the bag 21. The bag 21 is a pillow-type bag formed by laying one film having a substantially rectangular shape on another film having a substantially rectangular shape and then bonding these two films together at the periphery thereof, except for the region corresponding to the end portion 22. The bag 21 may be a gazette-type bag instead of a pillow-type bag. The films constituting the bag 21 are made of a material having flexibility and gas barrier properties. Some examples of the material of the films are polyethylene terephthalate (PET), nylon, polyethylene, or the like. The film may be formed using a layered structure including multiple film layers made of such a material. In such a layered structure, for example, an outer layer may be formed using PET or nylon, which excels in shock resistance, and an inner layer may be formed using polyethylene, which excels in ink resistance. Moreover, a film having a deposited layer such as an aluminum-deposited layer may be used as one of the constituents of a layered structure.

As illustrated in FIG. 5, the bag 21 has a liquid containing portion 21*c* inside. The liquid containing portion 21*c* is the inner space of the bag 21 for containing liquid. As the liquid, ink having pigments dispersed as a precipitating ingredient in a dissolvent is contained in the liquid containing portion 21*c*.

The liquid supplying port member 80 has a liquid supplying port 810. The liquid supplying port member 80 supplies the liquid contained in the liquid containing portion 21*c* toward the printer 11 through the liquid supplying port 810. In addition, the liquid supplying port member 80 accepts liquid that is being filled into the liquid containing portion 21*c* through the liquid supplying port 810. The liquid supplying port member 80 is made of, for example, synthetic resin such as polyethylene or polypropylene. The end portion 22 of the bag 21 is fixed to the liquid supplying port member 80. More particularly, a part of the liquid supplying port member 80 on the −Y-directional side is housed in the opening of the end portion 22, and the rest of the liquid supplying port member 80 on the +Y-directional side is exposed to the outside from the end portion 22. The liquid supplying port member 80 and the end portion 22 are welded to each other at, of the liquid supplying port member 80, the part housed in the opening of the end portion 22. Because of this fusion welding, the opening of the end portion 22 is hermetically sealed. The liquid supplying port 810 is used for letting the liquid contained in the liquid containing portion 21*c* out toward the printer 11 and is used also for filling liquid into the liquid containing portion 21*c*. A detailed structure of the liquid supplying port member 80 will be described later.

As illustrated in FIG. 5, the spacer member 70, the pair of liquid conduit tubes 73*a* and 73*b*, and the connecting member 72 are disposed inside the liquid containing portion 21*c*. The spacer member 70 is a structural component for forming an area space having a predetermined capacity inside the bag 21. The spacer member 70 is made of the same kind of synthetic resin as the synthetic resin of which the liquid supplying port member 80 is made. The spacer member 70 may be made of other synthetic resin different in kind from the synthetic resin of which the liquid supplying port member 80 is made. The spacer member 70 has a portion that is located relatively on the −Y-directional side in comparison with the pair of liquid conduit tubes 73*a* and 73*b*. The spacer member 70 is provided at a position intersecting with a plane parallel to a Y-Z plane going through the center axis CX of the liquid supplying port 810. The spacer member 70 has, on its −Y-directional end portion, a face 711 that is sloped such that the size of the spacer member 70 in the Z direction increases from the −Y-directional side toward the +Y-directional side. In the description below, the face 711 will be referred to as the sloped face 711. In the present embodiment, the spacer member 70 has a sloped face 711 on the −Z-directional side with respect to the center axis CX and has a sloped face 711 on the +Z-directional side with respect to the center axis CX. Therefore, the spacer member 70 has a tapered shape becoming narrower toward the −Y-directional side when viewed in the X direction. In the present embodiment, the meaning of the term "face" shall not be construed to be limited to a plane made of a flat surface only; the meaning of the term "face" encompasses a face having a groove or a concave portion, etc. in its surface, a face having a protrusion or a convex portion, etc. on its surface, and a virtual face enclosed by a frame, though not limited thereto. That is, the face may have surface irregularities or a through hole at a certain area of the face as long as it can be recognized as a "face" when viewed as a whole.

At least one of the topmost portion and the bottommost portion of the spacer member 70 is in contact with the internal surface of the bag 21 when the liquid container 20 is in a positional orientation of being attached to the printer 11. In the present embodiment, both of the topmost portion and the bottommost portion of the spacer member 70 are in contact with the internal surface of the bag 21. In the description below, the positional orientation of the liquid container 20 when the liquid container 20 is in a state of being attached to the printer 11 will be referred to as "attached orientation". In the present embodiment, when in the attached orientation, the height at the center of the bottommost portion of the spacer member 70 and the topmost portion of the spacer member 70 is equal to the height at the center axis CX of the liquid supplying port 810.

Figure 7:
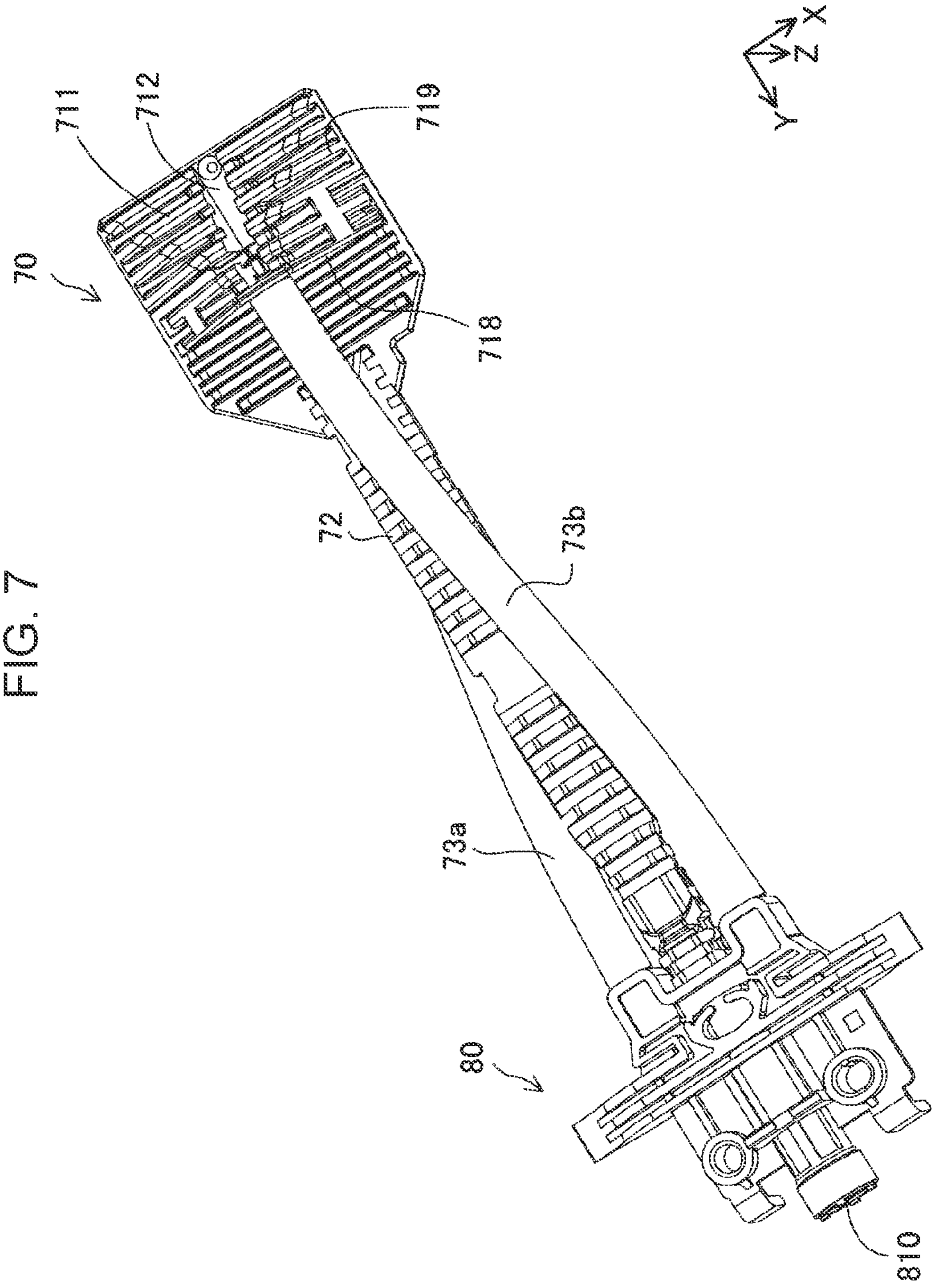
FIG. 7 is a first perspective view illustrating a spacer member, a pair of liquid conduit tubes, and a connecting member.
Figure 8:
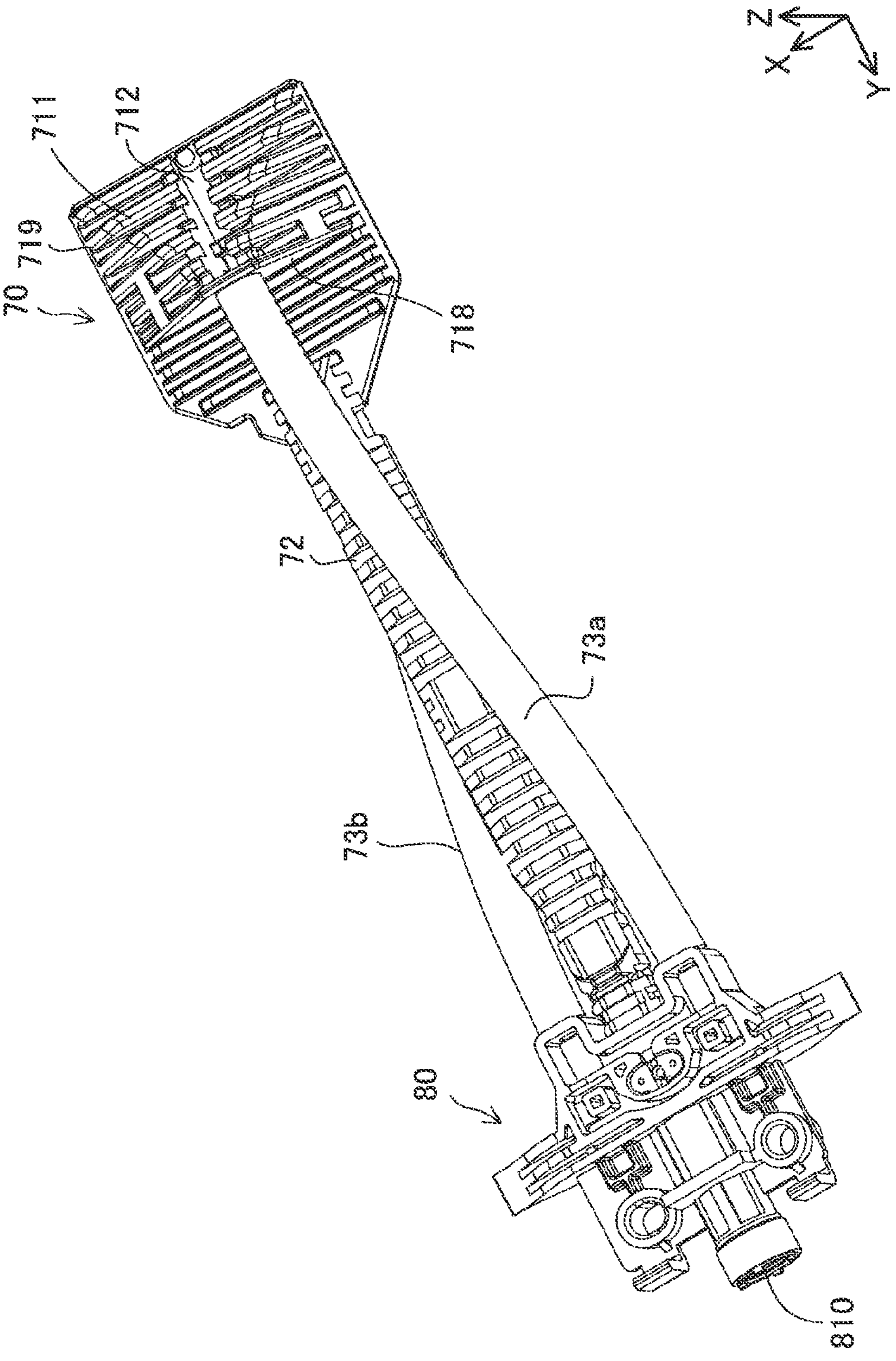
FIG. 8 is a second perspective view illustrating the spacer member, the pair of liquid conduit tubes, and the connecting member.
Figure 9:
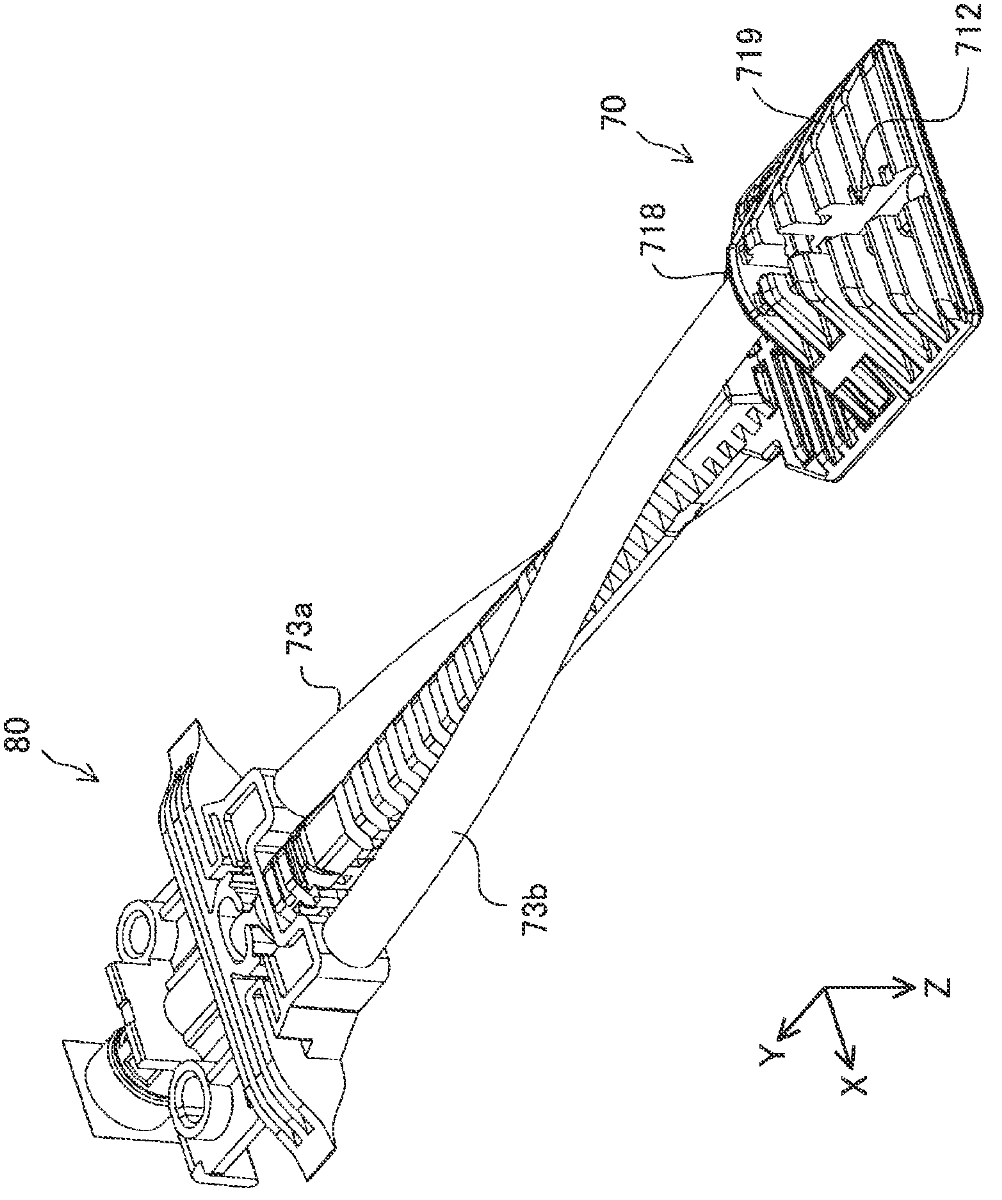
FIG. 9 is a third perspective view illustrating the spacer member, the pair of liquid conduit tubes, and the connecting member.
Figure 10:
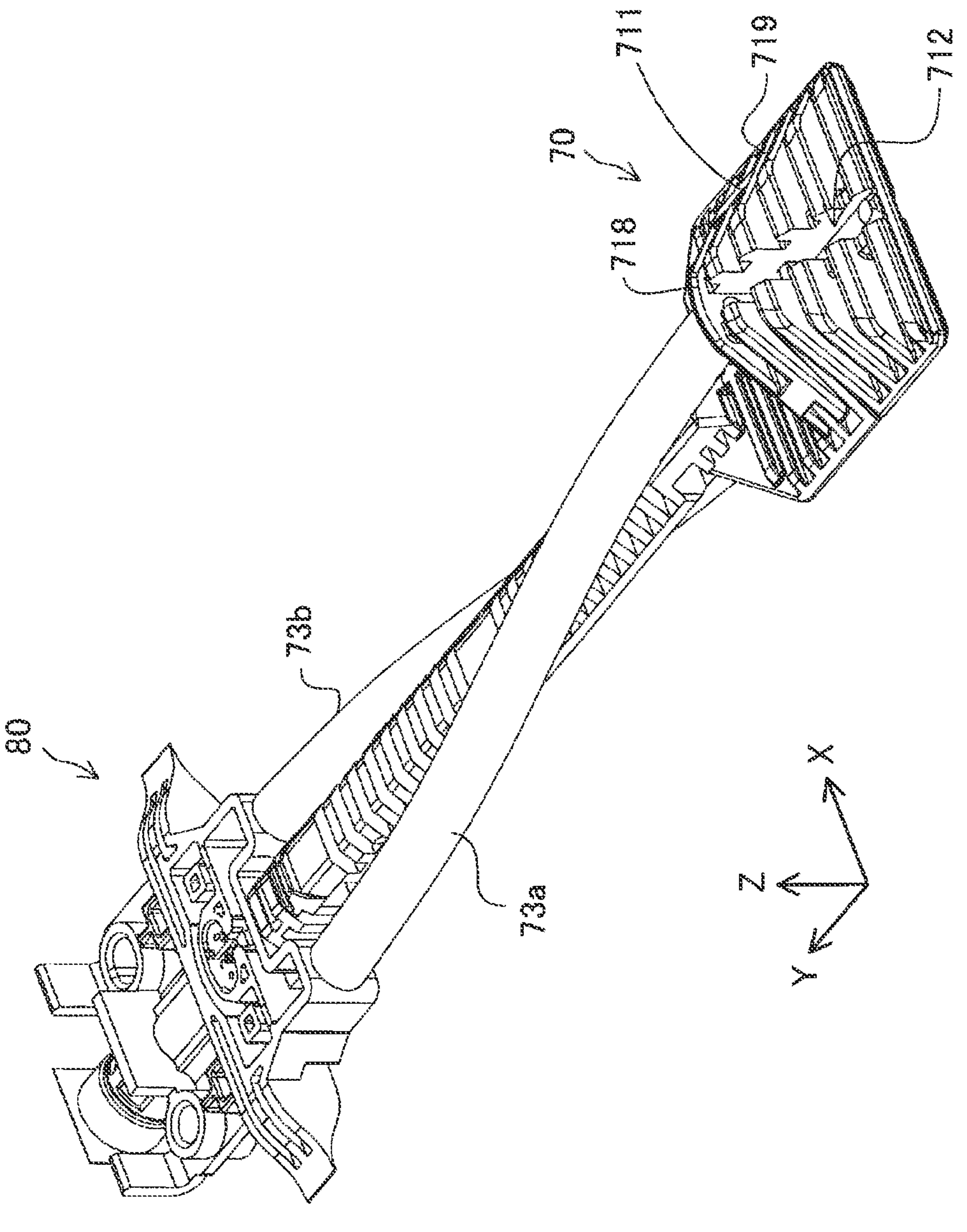
FIG. 10 is a fourth perspective view illustrating the spacer member, the pair of liquid conduit tubes, and the connecting member.
Figure 11:
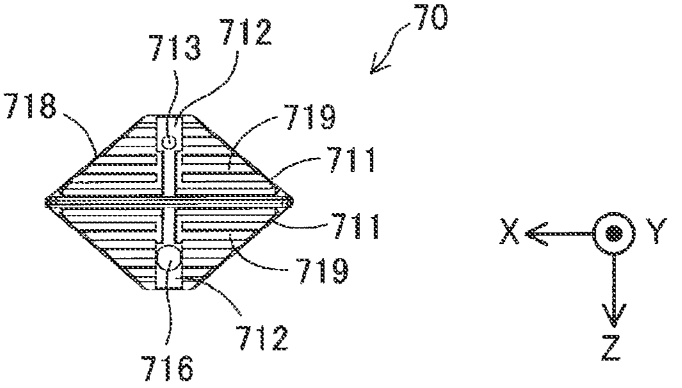
FIG. 11 is a front view of the spacer member.

FIG. 7 is a first perspective view illustrating the spacer member 70, the pair of liquid conduit tubes 73*a* and 73*b*, and the connecting member 72. FIG. 8 is a second perspective view illustrating the spacer member 70, the pair of liquid conduit tubes 73*a* and 73*b*, and the connecting member 72. FIG. 9 is a third perspective view illustrating the spacer member 70, the pair of liquid conduit tubes 73*a* and 73*b*, and the connecting member 72. FIG. 10 is a fourth perspective view illustrating the spacer member 70, the pair of liquid conduit tubes 73*a* and 73*b*, and the connecting member 72. FIG. 11 is a front view illustrating the spacer member 70.

As illustrated in FIGS. 7 to 11, the spacer member 70 includes a rear member 718. The rear member 718 is a plate-like member having a shape of a non-equilateral hexagon in a plan view. The rear member 718 is disposed in parallel with an X-Z plane at a portion, of the spacer member 70, having the largest Z-directional size. As illustrated in FIG. 11, a first conduit port 713 is formed in the rear member 718 on its −Z-directional side. A second conduit port 716 is formed in the rear member 718 on its +Z-directional side. The first conduit port 713 is an opening through which the liquid present relatively in an upper-side space of the liquid containing portion 21*c* inside the bag 21 flows into the second liquid conduit tube 73*b*. The second conduit port 716 is an opening through which the liquid present relatively in a lower-side space of the liquid containing portion 21*c* inside the bag 21 flows into the first liquid conduit tube 73*a*. The second liquid conduit tube 73*b* connected to the rear member 718 is in fluid communication with the first conduit port 713. The first liquid conduit tube 73*a* connected to the rear member 716 is in fluid communication with the second conduit port 716. The internal diameter of the first conduit port 713 is smaller than the internal diameter of the second conduit port 716. In other words, the internal diameter of the second conduit port 716 is larger than the internal diameter of the first conduit port 713. This structure makes it easier to suck in the liquid contained in the liquid containing portion 21*c* through the second conduit port 716, which is located at a lower position than the first conduit port 713, than through the first conduit port 713. The spacer member 70 has respective sloped faces not only on the −Z-directional side and the +Z-directional side with respect to the center axis CX but also on the −X-directional side and the +X-directional side with respect to the center axis CX.

As illustrated in FIGS. 7 to 11, the spacer member 70 has a groove-shaped first flow passage 712 and second flow passages 719. The first flow passage 712 is a passage for causing the liquid to flow in the +Y direction toward the first conduit port 713 and the second conduit port 716. The second flow passage 719 is a passage for causing the liquid to flow in a direction intersecting with the Y direction. In the present embodiment, a plurality of second flow passages 719 is formed. The second flow passages 719 are configured by forming grooves extending from the sloped faces 711 of the spacer member 70 in the vertical direction and in the X direction. The second flow passages 719 may be formed in such a way as to cause the liquid to flow in a direction intersecting with both the X direction and the Y direction. In another embodiment, at least one of the first flow passage 712 and the second flow passages 719 may be omitted.

The pair of liquid conduit tubes 73*a* and 73*b* guides, to the liquid supplying port member 80, the liquid having been sucked in through the second conduit port 716 and the first conduit port 713. The pair of liquid conduit tubes 73*a* and 73*b* are, for example, elastic tubes made of elastomer. The pair of liquid conduit tubes 73*a* and 73*b* have length equal to each other. As illustrated in FIGS. 7 to 10, in the present embodiment, when in the attached orientation, the +Y-side end portion of the first liquid conduit tube 73*a* and the +Y-side end portion of the second liquid conduit tube 73*b* are arranged next to each other in the horizontal direction. In addition, when in the attached orientation, the −Y-side end portion of the first liquid conduit tube 73*a* and the −Y-side end portion of the second liquid conduit tube 73*b* are arranged next to each other in the vertical direction. Therefore, after a change from a state of flowing next to each other in the vertical direction to a state of flowing next to each other in the horizontal direction, the liquid having been sucked in from the first liquid conduit tube 73*a* and the liquid having been sucked in the second liquid conduit tube 73*b* mix with each other inside the liquid supplying port member 80 and then flow out through the liquid supplying port 810 to the printer 11. In another embodiment, the +Y-side end portion of the first liquid conduit tube 73*a* and the +Y-side end portion of the second liquid conduit tube 73*b* may be arranged next to each other in the vertical direction, and the −Y-side end portion of the first liquid conduit tube 73*a* and the −Y-side end portion of the second liquid conduit tube 73*b* may be arranged next to each other in the horizontal direction. In another embodiment, the +Y-side end portion of the first liquid conduit tube 73*a* and the +Y-side end portion of the second liquid conduit tube 73*b* may be arranged next to each other in the vertical direction, and the −Y-side end portion of the first liquid conduit tube 73*a* and the −Y-side end portion of the second liquid conduit tube 73*b* may also be arranged next to each other in the vertical direction. In still another embodiment, the +Y-side end portion of the first liquid conduit tube 73*a* and the +Y-side end portion of the second liquid conduit tube 73*b* may be arranged next to each other in the horizontal direction, and the −Y-side end portion of the first liquid conduit tube 73*a* and the −Y-side end portion of the second liquid conduit tube 73*b* may also be arranged next to each other in the horizontal direction.

The connecting member 72 has a rod-like external shape. One end of the connecting member 72 is connected to the spacer member 70. The other end of the connecting member 72 is connected to the liquid supplying port member 80. The connecting member 72 provides connection between the spacer member 70 and the liquid supplying port member 80, thereby fixing the position of the spacer member 70 inside the liquid containing portion 21*c*. The connecting member 72 is disposed along the Y direction. Plural ribs arranged next to one another in the Y direction are provided on the surface of the connecting member 72. These ribs enhance the rigidity of the connecting member 72. The connecting member 72 is made of the same kind of synthetic resin as the synthetic resin of which the liquid supplying port member 80 is made. The connecting member 72 may be made of other synthetic resin different in kind from the synthetic resin of which the liquid supplying port member 80 is made.

As illustrated in FIG. 6, the adapter 60 is attached to the bag 21, and the bag 21 with the adapter 60 is housed into the printer 11. The adapter 60 is attached in such a way as to cover the liquid supplying port member 80. The adapter 60 has a mechanical structure for coupling the liquid container 20 to the connection mechanism 29. The adapter 60 has a body that can be disassembled into two supporting members (a first supporting portion 61 and a second supporting portion 62) vertically and includes a handle portion 51.

Figure 12:
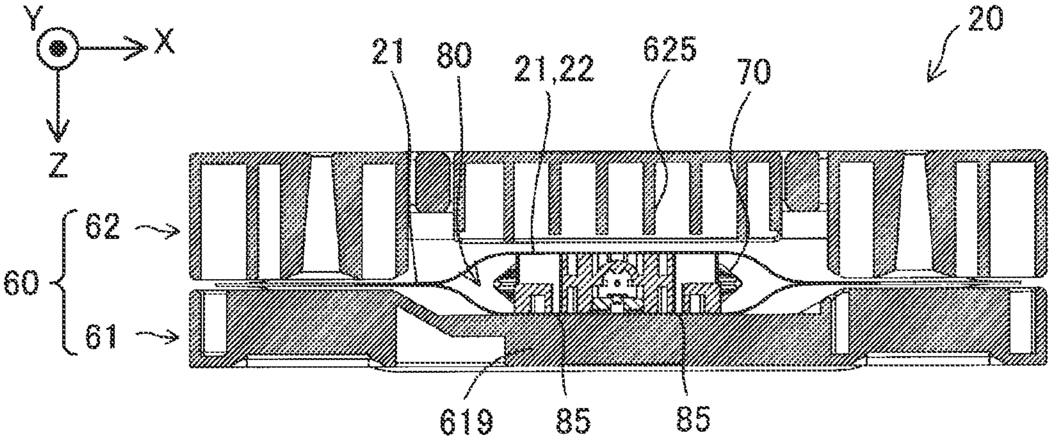
FIG. 12 is a cross-sectional view taken along the line XII-XII of FIG. 6.

FIG. 12 is a cross-sectional view taken along the line XII-XII of FIG. 6. The first supporting portion 61 is located on the +Z-directional side with respect to the second supporting portion 62 and the liquid supplying port member 80. The first supporting portion 61 supports the liquid supplying port member 80 from below. The first supporting portion 61 includes a placement portion 619. The placement portion 619 has a surface parallel to an X-Y plane (horizontal plane). When in the attached state, the liquid container 20 is placed on the placement portion 619. In other words, the placement portion 619 supports the liquid container 20 from below. The second supporting portion 62 is located on the −Z-directional side with respect to the first supporting portion 61 and the liquid supplying port member 80. The second supporting portion 62 includes many ribs 625 each extending in the +Z direction. In the present embodiment, the center portion of the liquid container 20 in the X direction is not in contact with the second supporting portion 62 (ribs 625). Both of the two end regions of the liquid container 20 in the X direction are supported by being clamped between the first supporting portion 61 and the second supporting portion 62.

As illustrated in FIG. 6, the first supporting portion 61 includes a terminal arrangement portion 614, an engagement groove 622, an insertion portion 621, a first receiving portion 623, and a second receiving portion 624.

The terminal arrangement portion 614 is formed as a concave portion recessed in the +Z direction. A container-side electric connection portion 50 is disposed on the terminal arrangement portion 614. When in the attached state, the terminal arrangement portion 614 accommodates the apparatus-side electric connection portion 40. The container-side electric connection portion 50 is provided on the surface of a circuit board. A memory configured to store various kinds of information about the liquid container 20, for example, the type of the liquid container 20, the amount of liquid contained in the liquid container 20, and the like is provided on the circuit board.

The engagement groove 622 is formed under the terminal arrangement portion 614 in the +Z-side end face of the first supporting portion 61. The engagement groove 622 is continuous to the +Y-side end face of the first supporting portion 61. The engagement groove 622 constitutes a part of the container-side anchoring structure and is configured to engage with the engagement portion 39 of the apparatus-side anchoring structure 38. The engagement groove 622 includes a groove that serves as a path along which the engagement portion 39 moves when the liquid container 20 is put (inserted) into the container accommodating portion 14, a groove that serves as a path along which the engagement portion 39 moves when the liquid container 20 is detached from the container accommodating portion 14, and a portion for engagement with the engagement portion 39 when in the attached state. The engagement of the engagement groove 622 with the engagement portion 39 fixes the position of the liquid container 20 when in the attached state.

The insertion portion 621 is located substantially at the center of the first supporting portion 61 in the X direction. The insertion portion 621 is formed as a hole that has its opening in the +Y-side end face of the first supporting portion 61 and extends in the Y direction. A supplying port forming portion 812, which will be described later, of the liquid supplying port member 80 is configured to be inserted into the insertion portion 621. Therefore, the liquid supplying port 810 is configured to be disposed at the insertion portion 621. When in the attached state, the liquid inlet portion 32 is inserted in the insertion portion 621.

The first receiving portion 623 is provided at a position on the −X-directional side with respect to the insertion portion 621 near the +Z-side end (bottom-side end) of the first supporting portion 61. The second receiving portion 624 is provided at a position on the +X-directional side with respect to the insertion portion 621 near the +Z-side end (bottom-side end) of the first supporting portion 61. Each of the first receiving portion 623 and the second receiving portion 624 is formed as a hole that has its opening in the +Y-side end face of the first supporting portion 61 and extends in the Y direction, similarly to the insertion portion 621. When in the attached state, the first positioning portion 45 is inserted in the first receiving portion 623. When in the attached state, the second positioning portion 46 is inserted in the second receiving portion 624. Because of this structure, the positioning of the liquid container 20 is performed when the liquid container 20 is inserted into the container accommodating portion 14 through the insertion slot 25.

The second supporting portion 62 includes an identification-portion-disposed portion 612 and an identification portion 613. The identification-portion-disposed portion 612 is formed as a concave portion recessed in the +Z direction. The identification portion 613 is disposed on the identification-portion-disposed portion 612. When in the attached state, the identification-portion-disposed portion 612 accommodates the block 44. The identification portion 613 has an upward concave-and-convex array shape. When the right matching one 20 among the plurality of liquid containers 20 is inserted into the container accommodating portion 14, the identification portion 613 comes into mating engagement with the block 44 of the container accommodating portion 14. In the present embodiment, with regard to the attachment of the liquid container 20 containing ink, for each of the four connection mechanisms of the container accommodating portion 14 to which the attachment is to be made, it has been pre-determined structurally which one of the colors of the ink match. The above-described "the right matching one 20 among the plurality of liquid containers 20" means the liquid container 20 containing the ink of the pre-determined matching color. The shape of the block 44 and the identification portion 613 differs from one ink color to another. For this reason, as described above, when the right matching one 20 among the plurality of liquid containers 20 is inserted into the container accommodating portion 14, the identification portion 613 of this right one comes into mating engagement with the block 44 of the container accommodating portion 14.

A3. Detailed Structure of Liquid Supplying Port Member 80

Figure 13:
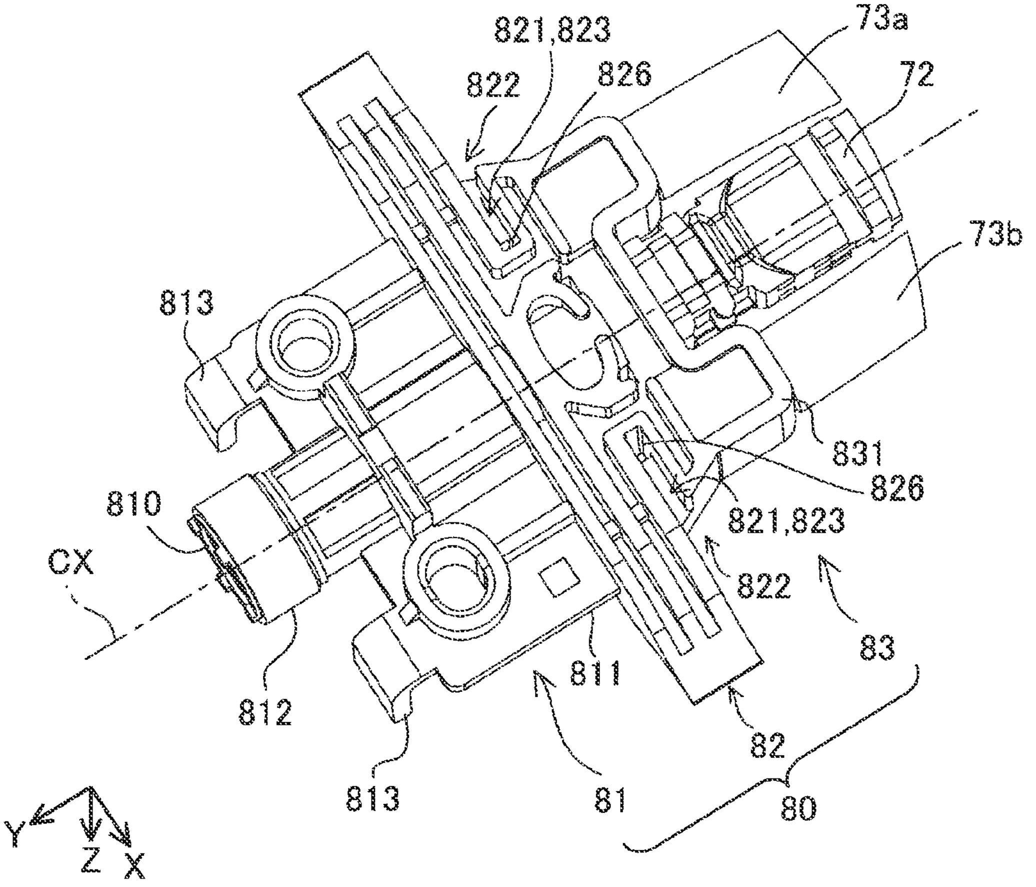
FIG. 13 is a first perspective view illustrating the detailed structure of a liquid supplying port member.
Figure 14:
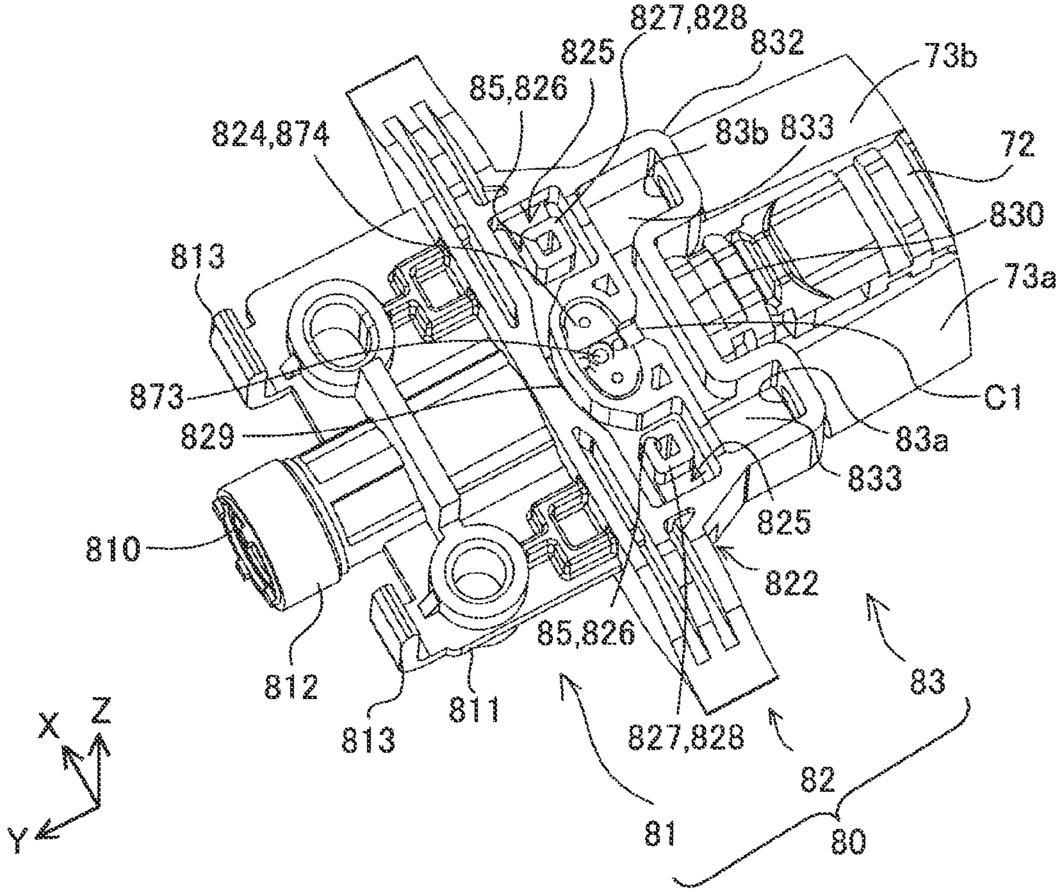
FIG. 14 is a second perspective view illustrating the detailed structure of the liquid supplying port member.
Figure 15:
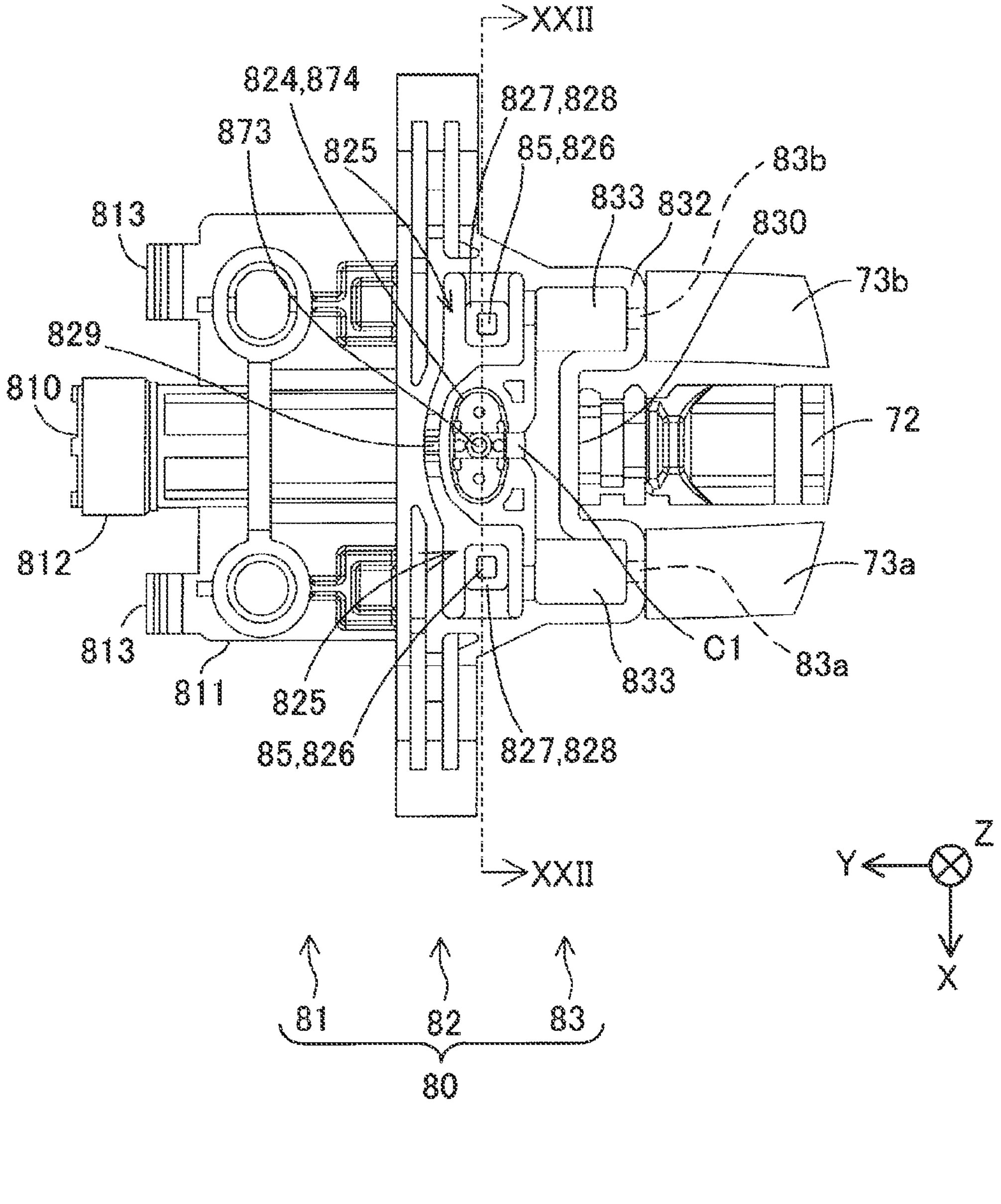
FIG. 15 is a bottom view illustrating the liquid supplying port member.

FIG. 13 is a first perspective view illustrating the detailed structure of the liquid supplying port member 80. FIG. 14 is a second perspective view illustrating the detailed structure of the liquid supplying port member 80. FIG. 15 is a bottom view illustrating the liquid supplying port member 80.

As illustrated in FIGS. 13, 14, and 15, the liquid supplying port member 80 includes a distal-end portion 81, a middle portion 82, and a base-end portion 83. A non-return valve (check valve 87 described later) that is not illustrated in FIGS. 13, 14, and 15 is provided inside the liquid supplying port member 80. The distal-end portion 81 is located at the most +Y-side position in the liquid supplying port member 80. The base-end portion 83 is located at the most −Y-side position in the liquid supplying port member 80. The middle portion 82 is located between the distal-end portion 81 and the base-end portion 83 at the center of the liquid supplying port member 80 in the Y direction. The liquid supplying port member 80 has a horizontally symmetrical structure (symmetric in the X direction) with respect to the center axis CX of the liquid supplying port 810.

The distal-end portion 81 has a plate-like portion 811, the supplying port forming portion 812, and a pair of positioning nails 813. The plate-like portion 811 has a shape that looks like a thin plate. The supplying port forming portion 812 has a cylindrical external shape. The liquid supplying port 810 is formed at the +Y-side end portion of the supplying port forming portion 812. The supplying port forming portion 812 is disposed such that its central axis agrees with the Y direction extending through the X-directional center of the plate-like portion 811. The central axis of the supplying port forming portion 812 is the same as the center axis CX of the liquid supplying port 810. One of the pair of positioning nails 813 is provided on the +Y-side end portion of the plate-like portion 811 on the +X-directional side with respect to the liquid supplying port 810. The other of the pair of positioning nails 813 is provided on the +Y-side end portion of the plate-like portion 811 on the −X-directional side with respect to the liquid supplying port 810. The pair of positioning nails 813 determines the position of the liquid supplying port member 80 in the adapter 60 by being hooked into a predetermined groove formed in the first supporting portion 61 of the adapter 60.

In comparison with the distal-end portion 81 and the base-end portion 83, the middle portion 82 protrudes more in the +X direction and the −X direction and protrudes more in the +Z direction and the −Z direction. The middle portion 82 has a hexagonal shape in a plan view in the Y direction. In addition, as illustrated in FIG. 15, the middle portion 82 has a substantially rectangular shape in a plan view in the Z direction. The end portion 22 of the bag 21 is welded to the middle portion 82.

Figure 16:
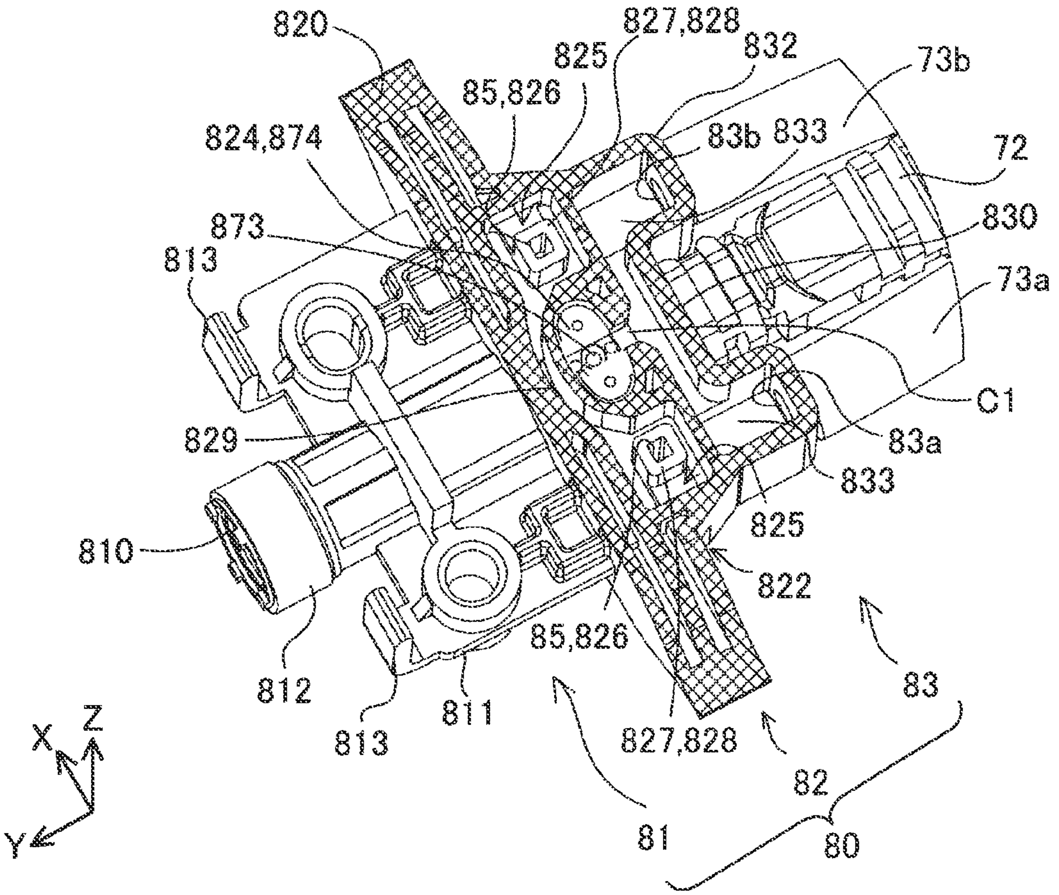
FIG. 16 is a diagram for explaining a welded portion of a middle portion welded to a bag.

FIG. 16 is a diagram for explaining a welded portion 820 of the middle portion 82 welded to the bag 21. FIG. 16 is the same as FIG. 14 except that the welded portion 820 is shown by hatching. As illustrated in FIGS. 13 to 16, many grooves having their depths in the Z direction are formed in the +Z-side face (bottom face) and the −Z-side face (top face) of the middle portion 82. The welded portion 820 is configured as a collective set of portions excluding these grooves. Though not illustrated, the welded portion 820 is formed also on the top face of the middle portion 82 illustrated in FIG. 13. The welded portion 820 is the portion to which the end portion 22 of the bag 21 is welded. A part of the above-described grooves formed in the liquid supplying port member 80 forms flow passages through which liquid flows between the liquid-supplying-port side and the bag 21. The part, of the liquid supplying port member 80, located on the +Y side with respect to the welded portion 820 is exposed from the bag 21 as illustrated in FIG. 5.

As illustrated in FIG. 13, a top-face flow-passage forming portion 821 is formed in the top face of the middle portion 82. The top-face flow-passage forming portion 821 forms top-face flow passages 823, which will be described later, between the liquid-supplying-port side and the bag 21. The top-face flow-passage forming portion 821 is configured by forming grooves extending in the X direction. One end of the top-face flow-passage forming portion 821 is in communication with communication passages 826, which will be described later. The other end of the top-face flow-passage forming portion 821 is not sealed, is open to the inside of the liquid containing portion 21*c*, and forms filling ports 822 between the liquid-supplying-port side and the bag 21. Liquid flows through the filling ports 822 in the process of being filled into the liquid containing portion 21*c*.

As illustrated in FIGS. 14 and 15, second reservoir portions 825, communication-port forming portions 827, an end opening 829, a check valve housing portion 824, and a first cutout portion C1 are formed on the bottom face of the middle portion 82.

The second reservoir portions 825 are configured by forming grooves having their depths in the −Z direction. Provided in a space formed between the liquid-supplying-port side and the bag 21, the second reservoir portions 825 temporarily retain liquid when the liquid is being filled into the liquid containing portion 21*c* (hereinafter simply referred to as "during filling"). The communication-port forming portions 827 protrude in the +Z direction from the bottom face of the second reservoir portions 825. The communication-port forming portion 827 has a hollow-pillar-like external shape. The communication passage 826 is formed inside the communication-port forming portion 827. The communication passage 826 is formed as a through hole going through the liquid supplying port member 80 in the thickness direction (Z direction). The liquid flows through the communication passage 826 during filling. Each communication port 85, which is an end of the corresponding communication passage 826, is in fluid communication with a liquid filling flow passage P2, which will be described later, and faces the internal surface of the bag 21. When in the attached state, the communication port 85 faces down. The height of the communication-port forming portion 827 is the same as the height of ribs (walls) forming the second reservoir portion 825. Therefore, when the liquid contained in the liquid containing portion 21*c* is being supplied to the printer 11 through the liquid supplying port 810 (hereinafter simply referred to as "during supply"), peripheral portions 828 of the communication ports 85 are in contact with the bag 21. The peripheral portion 828 corresponds to the +Z-side end face of the communication-port forming portion 827. The peripheral portion 828 is configured as a surrounding face forming the periphery of the communication port 85. As illustrated in FIG. 12, when in the attached state, the placement portion 619 of the first supporting portion 61 supports the liquid supplying port member 80 from below the communication ports 85 and causes the bag 21 to be in contact with the peripheral portions 828 of the communication ports 85. However, as illustrated in FIG. 16, the peripheral portions 828 are not welded to the bag 21. For this reason, as will be described later, the peripheral portions 828 are not in contact with the bag 21 during filling.

As illustrated in FIGS. 14 and 15, the end opening 829 is located at the center of the space of the second reservoir portions 825 in the X direction. The end opening 829 opens in the +Z direction at the ceiling face (−Z-side end face) of the second reservoir portions 825. The end opening 829 forms the −Z-side end of a second internal flow passage 852, which will be described later. The end opening 829 supplies the liquid to the second reservoir portions 825 during filling.

The check valve housing portion 824 is formed at the center in the X direction on the bottom face of the middle portion 82. The check valve housing portion 824 has a hollow oval-like external shape. A check valve 87, which will be described later, and a valve-seat supporting portion 874 are housed inside the check valve housing portion 824. The check valve 87 and the valve-seat supporting portion 874 will be explained in detail later.

The first cutout portion C1 is formed on the −Y-directional side adjacently in the (hollow oval-like) wall portion of the check valve housing portion 824. The first cutout portion C1 is relatively recessed in the −Z direction in comparison with other wall portion of the check valve housing portion 824. For this reason, as illustrated in FIG. 16, the first cutout portion C1 is not welded to the bag 21; moreover, the first cutout portion C1 is not in contact with the bag 21.

The base-end portion 83 includes a concave portion 830 recessed in the +Y direction. The base-end portion 83 is connected to the connecting member 72 at its concave portion 830. As illustrated in FIG. 13, a peripheral portion 831 on the top face of the base-end portion 83 protrudes slightly more in the −Z direction than other portions on the top face of the base-end portion 83. The bag 21 is welded to the peripheral portion 831.

As illustrated in FIGS. 14 and 15, the base-end portion 83 has, on its bottom side, a peripheral portion 832 and first reservoir portions 833. The first reservoir portions 833 are enclosed by and between the peripheral portion 832 and the middle portion 82.

Similarly to the peripheral portion 831 described above, the peripheral portion 832 protrudes more in the +Z direction than other portions on the bottom face of the base-end portion 83 (that is, in comparison with the first reservoir portions 833). As illustrated in FIG. 16, the bag 21 is welded to the peripheral portion 832. A first communication hole 83*a* is formed in the peripheral portion 832 on the −X-directional side with respect to the concave portion 830. The first liquid conduit tube 73*a* and the first reservoir portion 833 are in communication with each other through the first communication hole 83*a*. A second communication hole 83*b* is formed in the peripheral portion 832 on the +X-directional side with respect to the concave portion 830. The second liquid conduit tube 73*b* and the first reservoir portion 833 are in communication with each other through the second communication hole 83*b*.

The first reservoir portions 833 are configured by forming grooves having their depths in the −Z direction. Provided in a space formed between the valve side and the bag 21, the first reservoir portions 833 temporarily retain liquid during supply. Specifically, the liquid is supplied to the first reservoir portion 833 from the first liquid conduit tube 73*a* through the first communication hole 83*a*, and the liquid is supplied to the first reservoir portion 833 from the second liquid conduit tube 73*b* through the second communication hole 83*b*. As illustrated in FIGS. 14 and 15, the first reservoir portions 833 are in communication with the first cutout portion C1 formed in the middle portion 82. For this reason, the check valve housing portion 824 and the first reservoir portions 833 are in communication with each other through the first cutout portion C1.

A4. Flow of Liquid During Supply

Figure 17:
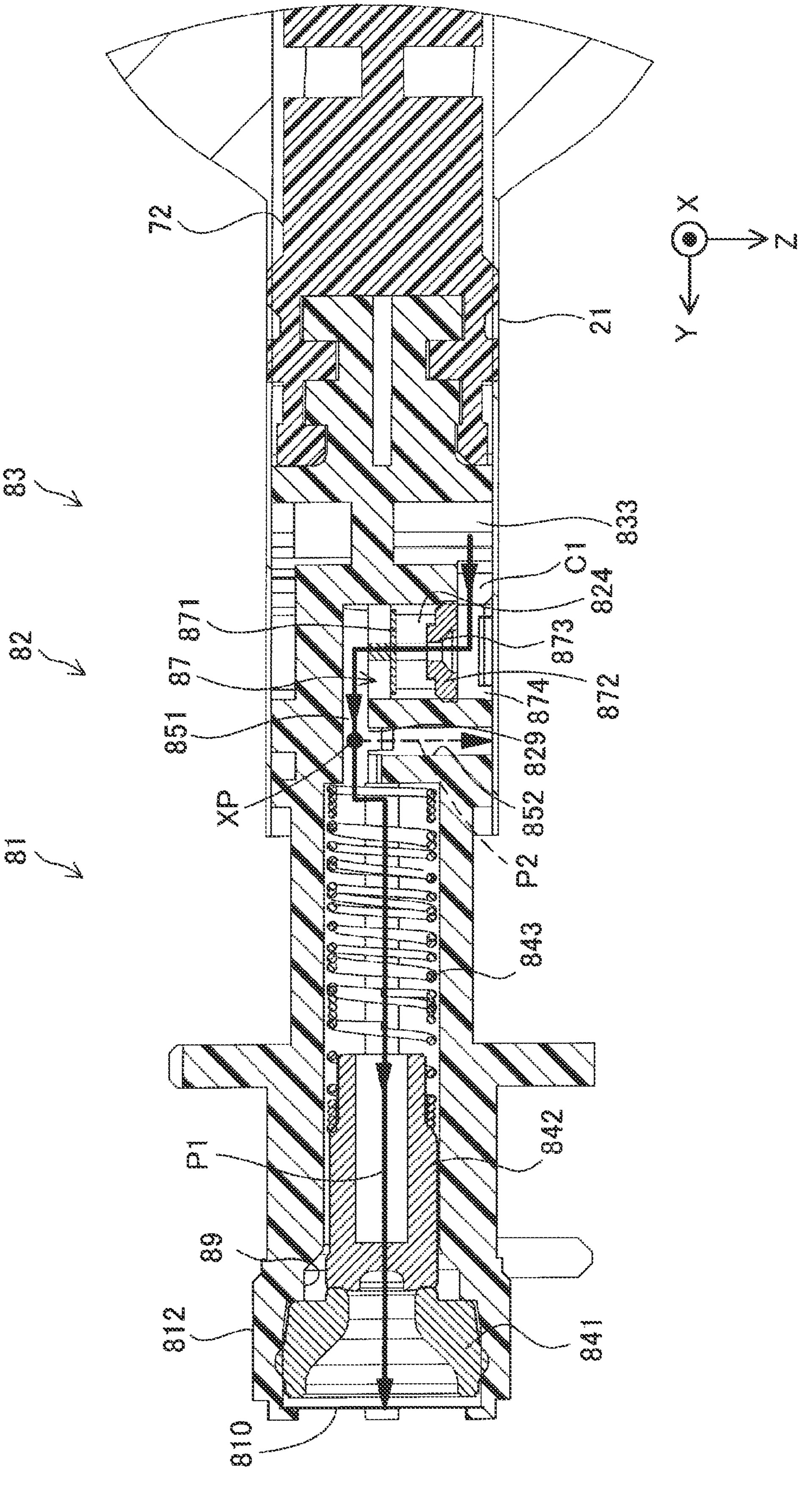
FIG. 17 is a first cross-sectional view illustrating a section of the liquid supplying port member along the center axis of its liquid supplying port.

FIG. 17 is a first cross-sectional view illustrating a section of the liquid supplying port member 80 along the center axis CX of the liquid supplying port 810. In FIG. 17, a section parallel to a Y-Z plane is illustrated. In FIG. 17, a liquid supply flow passage P1 is indicated by solid-line arrows. A liquid filling flow passage P2 is indicated by a broken-line arrow. The liquid supply flow passage P1 is provided inside the liquid supplying port member 80. The liquid supply flow passage P1 provides liquid communication from the liquid containing portion 21*c* toward the liquid supplying port 810. The liquid filling flow passage P2 branches off from the liquid supply flow passage P1. The liquid filling flow passage P2 is a flow passage through which liquid flows when the liquid is filled through the liquid supplying port 810 into the liquid containing portion 21*c* of the bag 21.

An axial hole 89 is formed along the center axis CX inside the distal-end portion 81 of the liquid supplying port member 80. A first flow-passage forming member 841, a second flow-passage forming member 842, and an elastic member 843 are provided inside the axial hole 89 in this order as viewed in the −Y direction from the liquid supplying port 810. The center axes of the first flow-passage forming member 841, the second flow-passage forming member 842, and the elastic member 843 are in alignment with one another. Each of the first flow-passage forming member 841 and the second flow-passage forming member 842 has a cylindrical external shape. The first flow-passage forming member 841 and the second flow-passage forming member 842 are disposed at positions corresponding to the inside of the supplying port forming portion 812. An annular protrusion is formed on the +Y-side end portion of the first flow-passage forming member 841. The annular protrusion is in engagement with a groove formed in the axial hole 89. The +Y-side end of the second flow-passage forming member 842 adjoins the −Y-side end of the first flow-passage forming member 841. In the present embodiment, the elastic member 843 is a coil spring. The +Y-side end of the elastic member 843 adjoins the −Y-side end of the second flow-passage forming member 842. The −Y-side end of the elastic member 843 is in contact with the −Y-side end wall of the axial hole 89. The elastic member 843 urges the second flow-passage forming member 842 in the +Y direction. As described above, the first flow-passage forming member 841 adjoining the second flow-passage forming member 842 on the +Y-directional side is in engagement with the internal groove of the axial hole 89. For this reason, the first flow-passage forming member 841 and the second flow-passage forming member 842 will never be displaced in the +Y direction from the state illustrated in FIG. 17.

The −Y-side end portion of the axial hole 89 reaches the inside of the middle portion 82 and is in communication with a first internal flow passage 851 formed inside the middle portion 82. The first internal flow passage 851 extends in the Y direction. The first internal flow passage 851 is in communication with the second internal flow passage 852. The second internal flow passage 852 extends in the Z direction. The −Z-side end of the second internal flow passage 852 corresponds to the end opening 829. The first internal flow passage 851 is able to be in communication with the inside of the check valve housing portion 824.

As described above, the check valve housing portion 824 having a hollow oval-like shape is formed inside the middle portion 82, and the check valve 87 and the valve-seat supporting portion 874 are housed inside the check valve housing portion 824. The check valve housing portion 824 is located between a branch position XP, at which the liquid filling flow passage P2 branches off from the liquid supply flow passage P1, and the liquid containing portion 21*c*. Therefore, the check valve 87 is located between the branch position XP and the liquid containing portion 21*c*.

The check valve 87 allows the liquid flowing from the liquid containing portion 21*c* toward the liquid supplying port 810 to pass and does not allow the liquid flowing from the liquid supplying port 810 toward the liquid containing portion 21*c* to pass. The check valve 87 includes a valve body 871 and a valve seat 872. The valve body 871 has a thin disc-like external shape. A cutout and through-hole structure is formed in its peripheral portion. The valve seat 872 has a low-profile cylindrical external shape. The valve seat 872 has a through hole 873 formed at its center. The through hole 873 is open when the valve body 871 is located at its upper position as illustrated in FIG. 17. When in this state, the inside of the check valve housing portion 824 is in communication with the first internal flow passage 851. There is an opening also in the ceiling of the check valve housing portion 824. The liquid is able to flow through this opening formed in the ceiling. On the other hand, the through hole 873 is closed by the valve body 871 when the valve body 871 is located at its lower position. When in this state, the inside of the check valve housing portion 824 is not in communication with the first internal flow passage 851.

Figure 18:
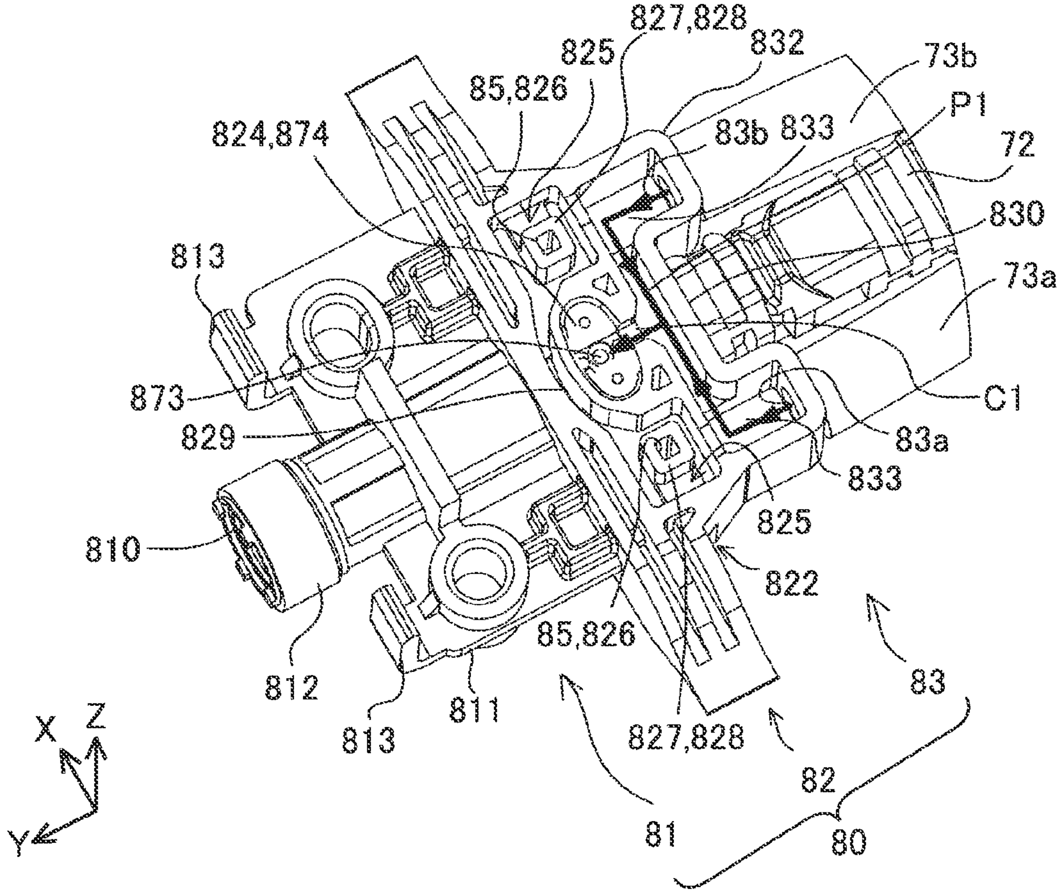
FIG. 18 is a diagram for explaining the part, of a liquid supply flow passage, exposed on the bottom face of the liquid supplying port member.

FIG. 18 is a diagram for explaining the part, of the liquid supply flow passage P1, exposed on the bottom face of the liquid supplying port member 80. In FIG. 18, the liquid supply flow passage P1 indicated by bold arrows is added to a perspective view of the liquid supplying port member 80 similar to that of FIG. 14.

When liquid is supplied, the liquid container 20 is accommodated in the container accommodating portion 14, and the liquid inlet portion 32 of the connection mechanism 29 is inserted in the insertion portion 621 and in the axial hole 89. In this state, when the liquid is supplied, the liquid sent from the spacer member 70 through the first liquid conduit tube 73*a* flows into the first reservoir portion 833 through the first communication hole 83*a* of the liquid supplying port member 80 as illustrated in FIG. 18. Similarly, the liquid sent from the spacer member 70 through the second liquid conduit tube 73*b* flows into the first reservoir portion 833 through the second communication hole 83*b* of the liquid supplying port member 80. The liquid that has flowed into the first reservoir portions 833 flows through the first cutout portion C1 and then reaches the valve-seat supporting portion 874.

As illustrated in FIG. 17, the liquid that has reached the check valve housing portion 824 pushes up the valve body 871 by flowing up through the through hole 873 and thus flows into the check valve housing portion 824. Then, the liquid flows from the check valve housing portion 824 into the first internal flow passage 851, flows inside the first internal flow passage 851 in the +Y direction, and then goes out through the liquid supplying port 810. Since the liquid inlet portion 32 of the connection mechanism 29 is inserted in the axial hole 89, the liquid enters the liquid inlet portion 32 and is supplied to the inside of the printer 11.

As illustrated in FIG. 17, since pressure-reducing suction is performed through the liquid supplying port 810 by a sucking means such as a suction pump of the printer 11, the bag 21 is in contact with the peripheral portions 828 of the communication ports 85, and the communication ports 85 are closed by the bag surface. This prevents the flow of the liquid from the liquid containing portion 21*c* toward the liquid supplying port 810 through the communication ports 85 and the liquid filling flow passage P2.

When the amount of the liquid left in the liquid containing portion 21*c* is reduced due to the supply of the liquid, the internal pressure of the liquid containing portion 21*c* becomes negative. In this case, with the valve body 871 interposed therebetween, pressure on the side where the first internal flow passage 851 is located (atmospheric pressure) becomes higher than pressure on the side where the through hole 873 is located (negative pressure), and the valve body 871 therefore moves down and comes into contact with the valve seat 872. Due to the contact of the valve body 871 with the valve seat 872, the through hole 873 becomes closed; therefore, air cannot flow through the through hole 873 from the first internal flow passage 851 into the liquid containing portion 21*c*. Consequently, it is possible to prevent the presence of liquid containing air bubbles inside the liquid containing portion 21*c* and prevent such liquid containing air bubbles from being supplied to the printer 11.

A5. Flow of Liquid During Filling

Figure 19:
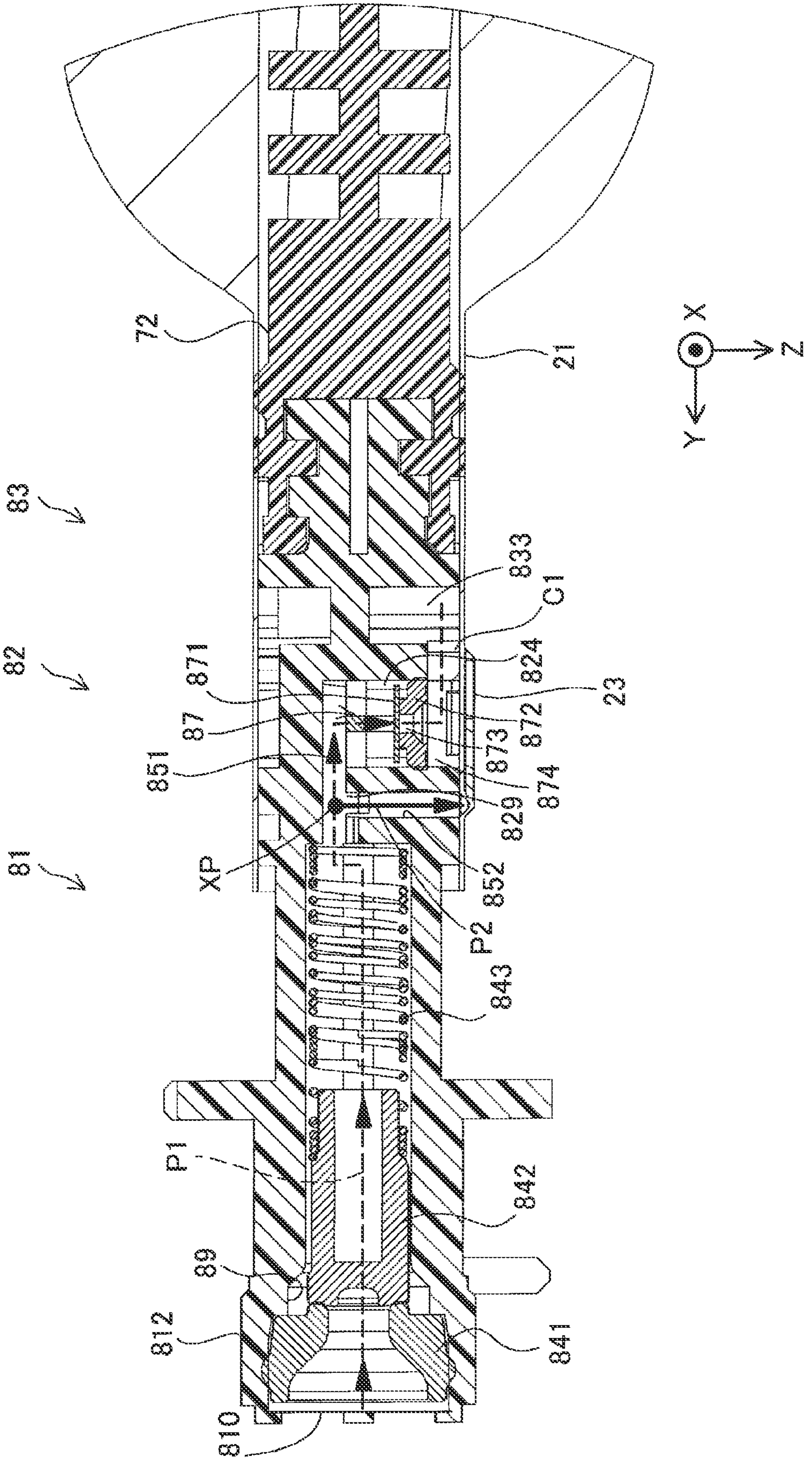
FIG. 19 is a second cross-sectional view illustrating a section of the liquid supplying port member along the center axis of its liquid supplying port.
Figure 20:
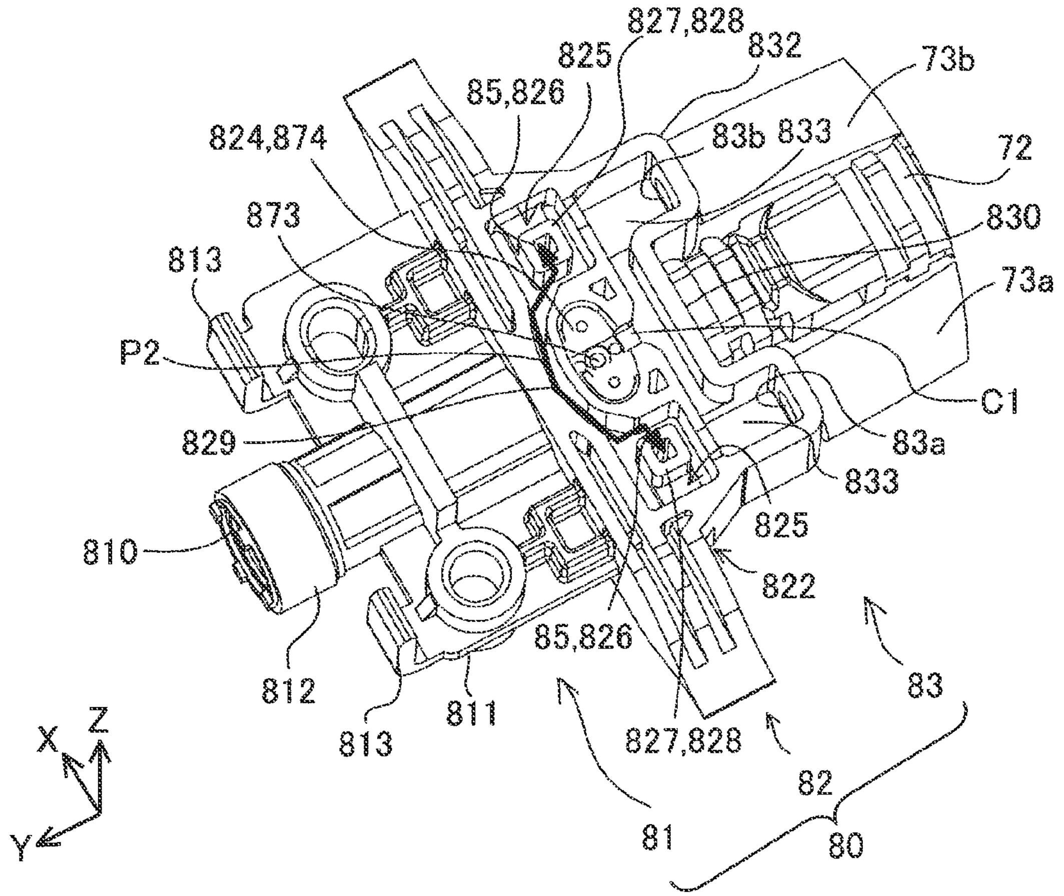
FIG. 20 is a diagram for explaining the part, of a liquid filling flow passage, exposed on the bottom face of the liquid supplying port member.
Figure 21:
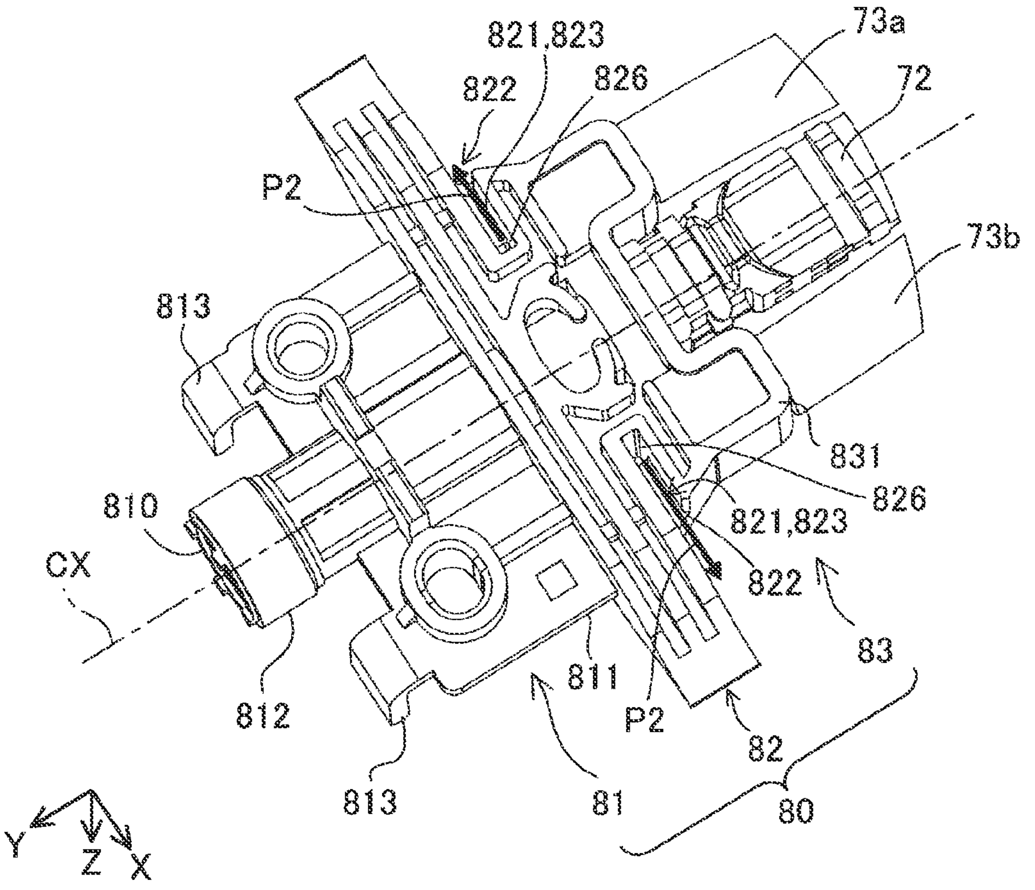
FIG. 21 is a diagram for explaining the part, of the liquid filling flow passage, exposed on the top face of the liquid supplying port member.
Figure 22:
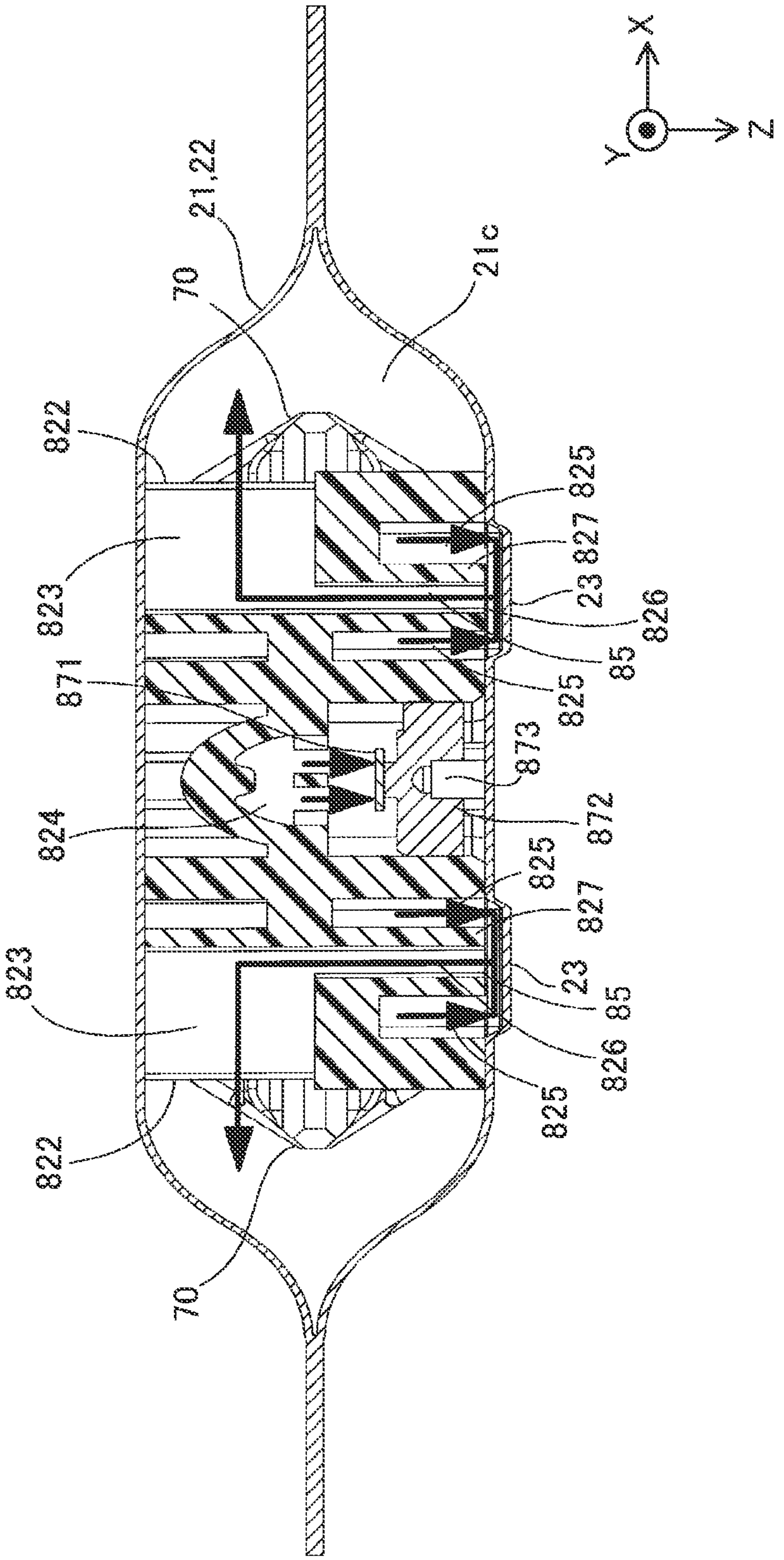
FIG. 22 is a diagram for explaining a part of the liquid filling flow passage.

FIG. 19 is a second cross-sectional view illustrating a section of the liquid supplying port member 80 along the center axis CX of the liquid supplying port 810. In FIG. 19, a section at the same position as that of FIG. 17 is illustrated. In FIG. 19, unlike FIG. 17, the liquid supply flow passage P1 is indicated by broken-line arrows, and the liquid filling flow passage P2 is indicated by a solid-line arrow. FIG. 20 is a diagram for explaining the part, of the liquid filling flow passage P2, exposed on the bottom face of the liquid supplying port member 80. In FIG. 20, the liquid filling flow passage P2 indicated by bold arrows is added to a perspective view of the liquid supplying port member 80 similar to that of FIG. 14. FIG. 21 is a diagram for explaining the part, of the liquid filling flow passage P2, exposed on the top face of the liquid supplying port member 80. In FIG. 21, the liquid filling flow passage P2 indicated by bold arrows is added to a perspective view similar to that of FIG. 13. FIG. 22 is a diagram for explaining a part of the liquid filling flow passage P2. In FIG. 22, a section taken along the line XXII-XXII of FIG. 15 is illustrated. In FIG. 22, the flow of liquid during filling is indicated by bold arrows. In FIG. 22, for easier illustration, each component is schematically illustrated in a Z-directionally-expanded manner.

When liquid is filled, the liquid container 20 has been detached from the container accommodating portion 14. In addition, the adapter 60 has been detached from the liquid container 20. A hollow supplying portion of a non-illustrated liquid filling apparatus is inserted into the axial hole 89 through the liquid supplying port 810. The positional orientation of the liquid container 20 in this state is the same as the positional orientation thereof in the attached state. In this state, when the liquid is supplied to the non-illustrated liquid filling apparatus into the axial hole 89, the liquid flows into the first internal flow passage 851. The adapter 60 does not necessarily have to have been detached when the liquid is filled. For example, when there is a clearance between the first supporting portion 61 and the liquid supplying port member 80 with the bag 21, or when the second supporting portion 62 does not press the liquid supplying port member 80 with the bag 21 onto the first supporting portion 61, there is no need to detach the adapter 60.

As illustrated in FIG. 19, a part of the liquid that has flowed into the first internal flow passage 851 flows into the check valve housing portion 824. When the liquid flows into the check valve housing portion 824, the liquid pushes the valve body 871 down and brings the valve body 871 into contact with the valve seat 872. Due to this contact, the through hole 873 is closed, and the space of the check valve housing portion 824 turns into a closed space; as illustrated in FIG. 22, therefore, the flow of the liquid through the through hole 873, or in other words, the flow of the liquid toward the liquid containing portion 21*c* through the through hole 873, is prevented.

On the other hand, the liquid that has flowed from the branch position XP illustrated in FIG. 19 into the second internal flow passage 852 flows through the end opening 829 into the second reservoir portions 825 as indicated by the arrows in FIG. 20. The peripheral portions 828 of the communication ports 8 are not welded to the bag 21, and the bag 21 has flexibility. For this reason, after the inside of the second reservoir portions 825 has been filled with the liquid, when liquid further flows into the second reservoir portions 825 through the end opening 829, the bag 21 deforms downward (in the +Z direction), and the peripheral portion 828 become separated from the bag 21.

Figure 23:
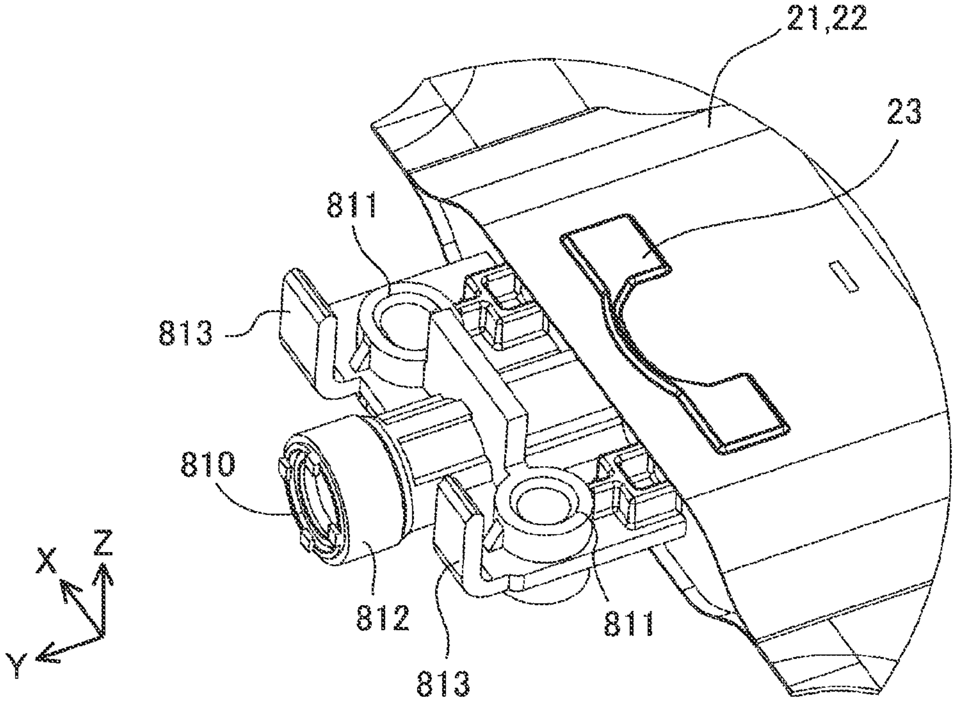

FIG. 23 is a perspective view illustrating the end portion 22 of the bag 21 when the liquid is filled in. As described above, after the inside of the second reservoir portions 825 has been filled with the liquid, when liquid further flows into the second reservoir portions 825 through the end opening 829, the bag 21 deforms downward, and a protruding portion 23 is formed. The protruding portion 23 protrudes relatively in the +Z direction in comparison with other portion on the +Z-side end face of the end portion 22. Since the peripheral portions 828 of the communication ports 85 are not welded to the bag 21 as described above, the portion, of the bag 21, corresponding to the peripheral portions 828 protrude in the +Z direction similarly to other portions. Consequently, the shape of the protruding portion 23 in plan view in the Z direction is approximately the same as the external shape of the second reservoir portions 825. Since the protruding portion 23 is formed in this way, a gap is formed between the peripheral portions 828 of the communication ports 85 and the bag 21. Therefore, as illustrated in FIG. 20, the liquid flows from the second reservoir portions 825 into the communication passages 826 through the gap.

As illustrated in FIGS. 21 and 22, the liquid that has flowed into the communication passages 826 on the bottom face of the liquid supplying port member 80 reaches the top-face flow passages 823 on the top face of the liquid supplying port member 80. Then, the liquid is supplied (filled) from the top-face flow passages 823 into the liquid containing portion 21*c* through the filling ports 822.

In the liquid container 20 according to the first embodiment described above, since the bag 21 is disposed in such a way as to be able to come into contact with the peripheral portions 828 of the communication ports 85, which are in liquid communication with the liquid filling flow passage P2 and exist on the path when in liquid communication with the liquid containing portion 21*c*, when liquid is supplied, the internal surface of the bag 21 comes in contact with the peripheral portions 828 of the communication ports 85 due to suction acting on the liquid-supplying-port side, thereby closing the communication ports 85. Therefore, no ink is supplied through the communication ports 85. Moreover, the bag 21 is fixed to the liquid supplying port member 80 in such a way as to form a gap between itself and the peripheral portions 828 of the communication ports 85 due to the flow of the liquid from the liquid supply flow passage P1 to the liquid filling flow passage P2 and in such a manner that the gap will be in liquid communication with the liquid containing portion 21*c* through the communication ports 85; therefore, it is possible to refill the liquid containing portion 21*c* with liquid easily by causing the liquid to flow into the liquid filling flow passage P2 from the liquid supply flow passage P1. Moreover, since there is no need to apply processing to the bag 21, etc. in advance before refilling, refilling is easy, and it is possible to reduce wastes that are produced. Furthermore, since there is no need to cut away a part of the bag 21 or bore a hole in the bag 21, it is possible to suppress a reduction in the amount of liquid filled. Furthermore, since there is no need to apply processing to the bag 21, etc., it is possible to suppress the entry of a foreign object into the bag 21, and it is possible to supply liquid to the printer 11 while keeping the quality of the liquid in a good state. Furthermore, unlike a structure in which the liquid filling flow passage P2 is closed after completing the supplying of liquid to the printer 11 first time, it is possible to omit a closing step, and it is possible to perform refilling. Furthermore, unlike a structure in which a liquid filling port has been provided in advance separately from the liquid supplying port 810 and in which, after the filling of liquid, the liquid filling port is crushed or sealed with a film or sealed with a cap, it is possible to omit a sealing member and a step of sealing the liquid filling port with the sealing member. In addition, there is no need to open the liquid filling port again at the time of refilling.

Furthermore, since the communication ports 85 are disposed in such a way as to face down when in the attached state, and since the first supporting portion 61 supports the liquid supplying port member 80 from below the communication ports 85 and causes the bag 21 to be in contact with the peripheral portions 828 of the communication ports 85 when in the attached state, it is possible to ensure that the bag 21 supported from below by the first supporting portion 61 is in tight contact with the peripheral portions 828 of the communication ports 85 by utilizing the self-weight of the liquid container 20 when in the attached state. Therefore, it is possible to suppress the flow of the liquid from the liquid containing portion 21*c* to the liquid filling flow passage P2 and thus supply the liquid from the liquid supply flow passage P1 well. In particular, the portions of the bag 21 facing the communication ports 85 do not get wrinkled easily thanks to the self-weight of the liquid container 20 and, therefore, it is possible to keep the state of tight contact of the peripheral portions 828 of the communication ports 85 and the bag 21 well, and it is possible to suppress the flow of the liquid from the liquid containing portion 21*c* to the liquid filling flow passage P2. Therefore, it is possible to prevent the liquid stagnant in the lower part of the liquid containing portion 21*c* and having higher concentration from being supplied through the liquid filling flow passage P2.

Furthermore, since the check valve 87, which allows the liquid flowing from the liquid containing portion 21*c* toward the liquid supplying port 810 to pass and does not allow the liquid flowing from the liquid supplying port 810 toward the liquid containing portion 21*c* to pass, is provided, even when the amount of the liquid left in the liquid containing portion 21*c* is reduced due to the supply of the liquid and when negative pressure therefore increases, it is possible to prevent the sucking of air into the liquid containing portion 21*c* through the liquid supplying port 810. Therefore, it is possible to prevent air bubbles from being supplied to the printer 11 and prevent a resultant decrease in print quality.

In the liquid container 20 according to the first embodiment described above, since the bag 21 is disposed in such a way as to be able to come into contact with the peripheral portions of the communication ports, which are in liquid communication with the liquid filling flow passage P2 and exist on the path when in liquid communication with the liquid containing portion, when the liquid is supplied, it is possible to prevent the liquid from returning from the liquid supply flow passage to the liquid containing portion through the communication ports. Moreover, the bag is fixed to the liquid supplying port member in such a way as to form a gap between itself and the peripheral portions of the communication ports due to the flow of the liquid from the liquid supply flow passage to the liquid filling flow passage and in such a manner that the gap will be in liquid communication with the liquid containing portion through the communication ports; therefore, it is possible to refill the liquid containing portion with liquid easily by causing the liquid to flow into the liquid filling flow passage from the liquid supply flow passage. Moreover, since there is no need to apply processing to the bag, etc. in advance before refilling, refilling is easy, and it is possible to reduce wastes that are produced. Furthermore, since there is no need to cut away a part of the bag 21 or bore a hole in the bag 21, it is possible to suppress a reduction in the amount of liquid filled. Furthermore, since there is no need to apply processing to the bag, etc., it is possible to suppress the entry of a foreign object into the bag, and it is possible to supply liquid to the printer while keeping the quality of the liquid in a good state. Furthermore, unlike a structure in which the liquid filling flow passage is closed after completing the supplying of liquid to the printer first time, it is possible to omit a closing step, and it is possible to perform refilling. Furthermore, unlike a structure in which a liquid filling port has been provided in advance separately from the liquid supplying port and in which, after the filling of liquid, the liquid filling port is crushed or sealed with a film or sealed with a cap, it is possible to omit a sealing member and a step of sealing the liquid filling port with the sealing member. In addition, there is no need to open the liquid filling port again at the time of refilling. Moreover, by using a bag that has an anti-liquid-evaporation function as the bag 21, it is possible to suppress the evaporation of liquid ingredients, in comparison with a liquid container whose opening is closed and opened by capping and uncapping.

B. Second Embodiment

Figure 24:
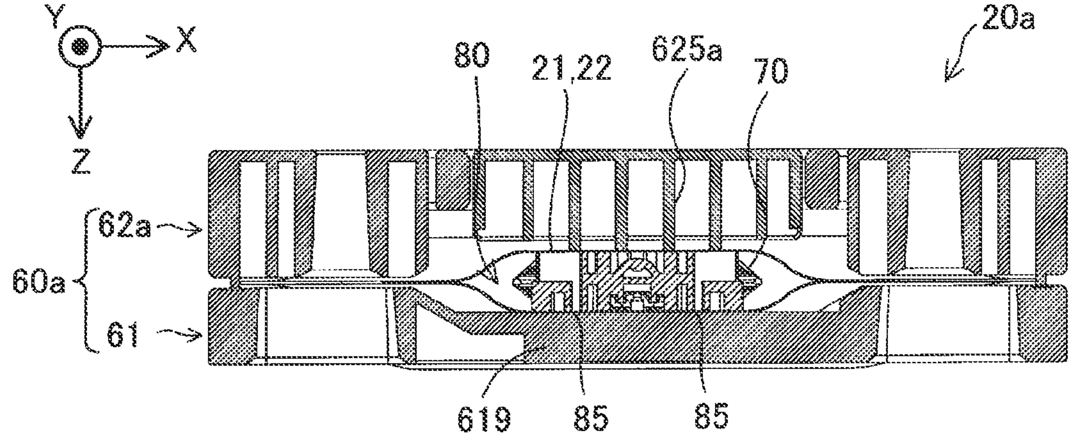
FIG. 24 is a cross-sectional view illustrating a liquid container according to a second embodiment.

FIG. 24 is a cross-sectional view illustrating a liquid container 20*a* according to a second embodiment. In FIG.

24, similarly to FIG. 12, a section along a close-sectional line at the same position as the position of the close-sectional line XII-XII of FIG. 6 is illustrated. The liquid container 20*a* according to the second embodiment is different from the liquid container 20 according to the first embodiment in that it includes an adapter 60*a* in place of the adapter 60. Except for this difference, the structure of the adapter 60*a* according to the second embodiment is the same as the structure of the adapter 60 according to the first embodiment. Therefore, the same reference signs are assigned to the components that are the same as those of the first embodiment, and a detailed explanation of them will not be given below.

The adapter 60*a* is different from the adapter 60 according to the first embodiment in that it includes a second supporting portion 62*a* in place of the second supporting portion 62. The second supporting portion 62*a* is different from the second supporting portion 62 according to the first embodiment in that it includes ribs 625*a* in place of the ribs 625. As illustrated in FIG. 24, the length of the ribs 625*a* in the Z direction is greater than that of the ribs 625 according to the first embodiment. Therefore, the +Z-side end of the ribs 625*a* is in contact with the end portion 22 of the bag 21, and the liquid supplying port member 80 is supported via the end portion 22 of the bag 21. Therefore, from the side opposite of the first supporting portion 61, the second supporting portion 62*a* supports the liquid supplying port member 80 such that the bag 21 is in contact with the peripheral portions 828 of the communication ports 85.

The liquid container 20*a* according to the second embodiment described above produces the same effects as those of the liquid container 20 according to the first embodiment. In addition, since the bag 21 is caused to be in contact with the peripheral portions 828 of the communication ports 85 by the first supporting portion 61 and the second supporting portion 62*a* via the bag 21, it is easier to ensure that the bag 21 is in contact with the peripheral portions 828 of the communication ports 85 more tightly. Therefore, it is possible to suppress the flow of the liquid from the liquid containing portion 21*c* toward the liquid filling flow passage P2 and thus supply the liquid well. Moreover, even when the first supporting portion 61 and the second supporting portion 62*a* are not located in the vertical direction, and, furthermore, even when the liquid container 20*a* is in a state of being detached from the printer 11, it is possible to hold the bag 21 in tight contact with the peripheral portions 828 of the communication ports 85, and it is possible to suppress the flow of the liquid from the liquid containing portion 21*c* toward the liquid filling flow passage P2. Therefore, even when the liquid container 20*a* is not attached to the printer 11, it is unlikely that the leakage of the liquid will occur. Furthermore, in comparison with a structure in which the liquid supplying port member 80 is supported by the first supporting portion 61 only, even when the amount of the liquid left in the liquid containing portion 21*c* is small, it is possible to make it harder for the state of tight contact of the peripheral portions 828 of the communication ports 85 and the bag 21 to be lost. Furthermore, it is possible to judge easily whether the liquid container is refillable or not by checking the supporting state of the first supporting portion 61 and the second supporting portion 62*a*.

C. Other Embodiments (C1) In each embodiment, the adapter 60, 60*a* may be omitted. In such a structure, the bag 21, with the liquid supplying port member 80 welded to its end portion 22, may be encased in a case made of resin, and the terminal arrangement portion 614, the insertion portion 621, the identification-portion-disposed portion 612, the identification portion 613, the first receiving portion 623, the second receiving portion 624, and the engagement groove 622, etc. may be formed in/on the case. The case may have a shape of a rectangular parallelepiped having a cavity formed inside. Alternatively, the case may have an open-topped (open in the −Z direction) tray-like shape. The liquid container 20 encased in a case as described above is called as, for example, "ink cartridge".

(C2) The structure of the liquid container 20, 20*a* according to each embodiment may be applied to, besides a liquid container configured to be attached to a printer configured to eject ink, a liquid container configured to be attached to a printer configured to eject any other kind of liquid. For example, the structure of the liquid container 20, 20*a* according to each embodiment may be applied to a liquid container configured to be attached to the following various kinds of printer (liquid ejecting apparatus):

(a) Image recording apparatus such as a facsimile apparatus, etc.;
(b) Colorant ejecting printer used in color filter production for an image display device such as a liquid crystal display, etc.;
(c) Electrode material ejecting printer used in forming electrodes of an organic EL (Electro Luminescence) display, a surface-emitting display (Field Emission Display, FED), etc.;
(d) Printer configured to eject liquid containing a living organic material used in biochip fabrication;
(e) Sample ejecting printer to be used as a high-precision pipette;
(f) Lubricating oil ejecting printer;
(g) Liquid resin ejecting printer;
(h) Printer configured to eject, with pinpoint accuracy, lubricating oil onto a precision device such as a watch, a camera, or the like;
(i) Printer configured to eject transparent liquid resin such as ultraviolet ray curing resin onto a substrate so as to form a micro hemispherical lens (optical lens) used in an optical communication element, etc.;
(j) Printer configured to eject an acid etchant or an alkaline etchant for etching a substrate, etc.;
(k) Printer equipped with a liquid consuming head configured to eject any other kind of micro droplets.

The term "liquid droplet" refers to a state of liquid ejected from a printer and encompasses a particulate droplet, a tear-shaped droplet, and a droplet that forms a thready tail. The "liquid" mentioned herein may be any material that can be consumed by a printer. For example, "liquid" may be any material that is in a liquid phase, including but not limited to: a material that is in a state of liquid having high viscosity or low viscosity, sol or gel water, other inorganic solvent or organic solvent, solution, liquid resin, and liquid metal (metal melt). The term "liquid" encompasses not only liquid as a state of substance but also liquid made as a result of dissolution, dispersion, or mixture of particles of a functional material made of a solid such as pigment or metal particles, etc. into/with a solvent. Typical examples of the liquid are ink described in the foregoing embodiments and liquid crystal, etc. The term "ink" encompasses various kinds of liquid composition such as popular water-based ink, oil-based ink, gel ink, hot melt ink, etc.

(C3) The structure of the liquid container 20, 20*a* according to each embodiment is a mere example. The disclosed examples may be modified in various ways. For example, the spacer member 70 does not have to be fixed to the liquid supplying port member 80. For example, the spacer member 70 may be fixed to the internal surface of the bag 21. In each embodiment, at least one of the first flow-passage forming member 841, the second flow-passage forming member 842, and the elastic member 843 may be omitted. In each embodiment, the check valve 87 may be omitted.

D. Other Modifications

The scope of the present disclosure is not limited to the foregoing embodiments. The present disclosure may be modified in various ways within a range of not departing from its spirit. For example, the present disclosure may be modified as follows. Technical features in the foregoing embodiments corresponding to technical features in the modifications described below may be replaced or combined in order to solve a part or a whole of problems addressed by the present disclosure or produce a part or a whole of effects of the present disclosure. Some technical features may be deleted where unnecessary unless they are explained explicitly as indispensable in this specification.

(1) In a certain aspect of the present disclosure, a liquid container refillable with liquid to be supplied to a printer is provided. The liquid container includes: a bag having a liquid containing portion inside; a liquid supplying port member having a liquid supplying port, an end portion of the bag being fixed to the liquid supplying port member; a liquid supply flow passage provided inside the liquid supplying port member, the liquid flowing through the liquid supply flow passage for fluid communication from the liquid containing portion toward the liquid supplying port; a liquid filling flow passage provided inside the liquid supplying port member and branching off from the liquid supply flow passage; and a communication port provided inside the liquid supplying port member and being in communication with the liquid filling flow passage and facing an internal surface of the bag, wherein the bag is disposed in such a way as to come into contact with a peripheral portion of the communication port and is fixed to the liquid supplying port member such that a gap is formed between the bag and the peripheral portion due to a flow of the liquid from the liquid supply flow passage to the liquid filling flow passage and such that the gap is in fluid communication with the liquid containing portion through the communication port.

In the liquid container according to this aspect, since the bag is disposed in such a way as to be able to come into contact with the peripheral portion of the communication port, which is in liquid communication with the liquid filling flow passage and exists on the path when in liquid communication with the liquid containing portion, when the liquid is supplied, it is possible to prevent the liquid from returning from the liquid supply flow passage to the liquid containing portion through the communication port. Moreover, the bag is fixed to the liquid supplying port member in such a way as to form a gap between itself and the peripheral portion of the communication port due to the flow of the liquid from the liquid supply flow passage to the liquid filling flow passage and in such a manner that the gap will be in liquid communication with the liquid containing portion through the communication port; therefore, it is possible to refill the liquid containing portion with liquid easily by causing the liquid to flow into the liquid filling flow passage from the liquid supply flow passage. Moreover, since there is no need to apply processing to the bag, etc. in advance before refilling, refilling is easy, and it is possible to reduce wastes that are produced. Furthermore, since there is no need to cut away a part of the bag or bore a hole in the bag, it is possible to suppress a reduction in the amount of liquid filled. Furthermore, since there is no need to apply processing to the bag, etc., it is possible to suppress the entry of a foreign object into the bag, and it is possible to supply liquid to the printer while keeping the quality of the liquid in a good state. Furthermore, unlike a structure in which the liquid filling flow passage is closed after completing the supplying of liquid to the printer first time, it is possible to omit a closing step, and it is possible to perform refilling. Furthermore, unlike a structure in which a liquid filling port has been provided in advance separately from the liquid supplying port and in which, after the filling of liquid, the liquid filling port is crushed or sealed with a film or sealed with a cap, it is possible to omit a sealing member and a step of sealing the liquid filling port with the sealing member. In addition, there is no need to open the liquid filling port again at the time of refilling. Moreover, by using a bag that has an anti-liquid-evaporation function as the bag, it is possible to suppress the evaporation of liquid ingredients, in comparison with a liquid container whose opening is closed and opened by capping and uncapping.

(2) The liquid container according to the above aspect may further include: a first supporting portion supporting the liquid supplying port member via the end portion of the bag, wherein the communication port may be disposed in such a way as to face down when in an attached state, meaning a state of attachment of the liquid container to the printer, and when in the attached state, the first supporting portion may support the liquid supplying port member from below the communication port and cause the bag to be in contact with the peripheral portion.

With the structure of this liquid container, since the communication port is disposed in such a way as to face down when in the attached state, and since the first supporting portion supports the liquid supplying port member from below the communication port and causes the bag to be in contact with the peripheral portion of the communication port when in the attached state, it is possible to ensure that the bag supported from below by the first supporting portion is in tight contact with the peripheral portion of the communication port by utilizing the self-weight of the liquid container when in the attached state. Therefore, it is possible to suppress the flow of the liquid from the liquid containing portion to the liquid filling flow passage and thus supply the liquid from the liquid supply flow passage well. In particular, the portion of the bag facing the communication port does not get wrinkled easily thanks to the self-weight of the liquid container and, therefore, it is possible to keep the state of tight contact of the peripheral portion of the communication port and the bag well, and it is possible to suppress the flow of the liquid from the liquid containing portion to the liquid filling flow passage. Therefore, it is possible to prevent the liquid stagnant in the lower part of the liquid containing portion and having higher concentration from being supplied through the liquid filling flow passage.

(3) The liquid container according to the above aspect may further include: a first supporting portion and a second supporting portion supporting the liquid supplying port member via the end portion of the bag, wherein the first supporting portion may indirectly face the communication port with the bag interposed therebetween and support the liquid supplying port member in such a way as to cause the bag to be in contact with the peripheral portion of the communication port, and the second supporting portion may support the liquid supplying port member from a side opposite of the first supporting portion with respect to the communication port in such a way as to cause the bag to be in contact with the peripheral portion.

With the structure of this liquid container, since the bag is caused to be in contact with the peripheral portion of the communication port by the first supporting portion and the second supporting portion via the bag, it is easier to ensure that the bag is in contact with the peripheral portion of the communication port more tightly. Therefore, it is possible to suppress the flow of the liquid from the liquid containing portion toward the liquid filling flow passage and thus supply the liquid well. Moreover, even when the first supporting portion and the second supporting portion are not located in the vertical direction, and, furthermore, even when the liquid container is in a state of being detached from the printer, it is possible to hold the bag in tight contact with the peripheral portion of the communication port, and it is possible to suppress the flow of the liquid from the liquid containing portion toward the liquid filling flow passage. Therefore, even when the liquid container is not attached to the printer, it is unlikely that the leakage of the liquid will occur. Furthermore, in comparison with a structure in which the liquid supplying port member is supported by the first supporting portion only, even when the amount of the liquid left in the liquid containing portion is small, it is possible to make it harder for the state of tight contact of the peripheral portion of the communication port and the bag to be lost. Furthermore, it is possible to judge easily whether the liquid container is refillable or not by checking the supporting state of the first supporting portion and the second supporting portion.

(4) The liquid container according to the above aspect may further include: a check valve disposed between a branch position, at which the liquid filling flow passage branches off from the liquid supply flow passage, and the liquid containing portion, wherein the check valve may be configured to allow the liquid flowing from the liquid containing portion toward the liquid supplying port to pass and not to allow the liquid flowing from the liquid supplying port toward the liquid containing portion to pass.

With the structure of this liquid container, since the check valve, which allows the liquid flowing from the liquid containing portion toward the liquid supplying port to pass and does not allow the liquid flowing from the liquid supplying port toward the liquid containing portion to pass, is provided, even when the amount of the liquid left in the liquid containing portion is reduced due to the supply of the liquid and when negative pressure therefore increases, it is possible to prevent the sucking of air into the liquid containing portion through the liquid supplying port. Therefore, it is possible to prevent air bubbles from being supplied to the printer and prevent a resultant decrease in print quality.

What is claimed is:

1. A liquid container refillable with liquid to be supplied to a printer, the liquid container comprising:

a bag having a liquid containing portion inside;

a liquid supplying port member having a liquid supplying port, an end portion of the bag being fixed to the liquid supplying port member;

a liquid supply flow passage provided inside the liquid supplying port member and configured to pass the liquid therein for fluid communication from the liquid containing portion toward the liquid supplying port;

a liquid filling flow passage provided inside the liquid supplying port member and branching off from the liquid supply flow passage; and a communication port provided inside the liquid supplying port member and being in communication with the liquid filling flow passage and facing an internal surface of the bag, wherein the liquid filling flow passage is configured to receive the liquid that is branched off from the liquid supply flow passage and pass the liquid branched off from the liquid supply flow passage toward the communication port, and the bag is fixed to the liquid supplying port member in such a way that when the liquid flows along the liquid supply flow passage toward the liquid supplying port, the bag comes into contact with a peripheral portion of the communication port, and when the liquid branches from the liquid supply flow passage into the liquid filling flow passage toward the communication port, a gap is formed between the bag and the peripheral portion and is in fluid communication with the liquid containing portion through the communication port.

2. The liquid container according to claim 1, further comprising:

a first supporting portion supporting the liquid supplying port member via the end portion of the bag, wherein the communication port is disposed in such a way as to face down in an attached state that the liquid container is attached to the printer, and when in the attached state, the first supporting portion supports the liquid supplying port member from below the communication port and causes the bag to be in contact with the peripheral portion.

3. The liquid container according to claim 1, further comprising:

a first supporting portion and a second supporting portion supporting the liquid supplying port member via the end portion of the bag, wherein the first supporting portion indirectly faces the communication port with the bag interposed therebetween and supports the liquid supplying port member in such a way as to cause the bag to be in contact with the peripheral portion of the communication port, and the second supporting portion supports the liquid supplying port member from a side opposite of the first supporting portion with respect to the communication port in such a way as to cause the bag to be in contact with the peripheral portion.

4. The liquid container according to claim 1, further comprising:

a check valve disposed between a branch position, at which the liquid filling flow passage branches off from the liquid supply flow passage, and the liquid containing portion, wherein the check valve allows the liquid flowing from the liquid containing portion toward the liquid supplying port to pass and does not allow the liquid flowing from the liquid supplying port toward the liquid containing portion to pass.

* * * * *